United States Patent [19]

Cahill et al.

[11] 4,299,490

[45] Nov. 10, 1981

[54] PHASE NULLING OPTICAL GYRO

[75] Inventors: Richard F. Cahill, El Toro; Eric Udd, Huntington Beach, both of Calif.

[73] Assignee: McDonnell Douglas Corporation, Long Beach, Calif.

[21] Appl. No.: 967,267

[22] Filed: Dec. 7, 1978

[51] Int. Cl.³ .............................................. G01C 19/64
[52] U.S. Cl. ................................................... 356/350
[58] Field of Search ........................ 356/350; 350/96.2

[56] References Cited

U.S. PATENT DOCUMENTS

| 3,102,953 | 9/1963 | Wallace | 356/350 |
|---|---|---|---|
| 3,395,270 | 7/1968 | Speller | 364/453 |
| 3,411,849 | 11/1968 | Aronowitz | 331/94.5 |
| 3,503,005 | 3/1970 | Mocker | 356/350 |
| 3,512,890 | 5/1970 | McLaughlin | 356/350 |
| 3,627,422 | 12/1971 | Chodorow | 250/199 X |
| 3,697,887 | 10/1972 | Lee et al. | 331/94.5 |
| 3,743,969 | 7/1973 | Hutchings | 356/350 |
| 3,807,866 | 4/1974 | Zingery | 356/350 |
| 3,854,819 | 12/1974 | Andringa | 356/350 |
| 4,006,989 | 12/1974 | Andringa | 356/350 |
| 4,013,365 | 3/1977 | Vali et al. | 356/350 |
| 4,039,260 | 8/1977 | Redman | 356/350 |
| 4,153,331 | 5/1979 | Cross | 350/96.2 |

FOREIGN PATENT DOCUMENTS

| 1807247 | 9/1971 | Fed. Rep. of Germany | 356/350 |
| 197805 | 5/1978 | Fed. Rep. of Germany | 356/350 |

OTHER PUBLICATIONS

Davis, J. L. and Ezekiel, S., "Techniques for Shot-Noise-Limited Inertial Rotation Measurement Using a Multiturn Fiber Square Interferometer", SPIE vol. 157 Laser Inertial Rotation Sensors (1978), p. 131.
Goss, W. C. et al., "Fiber Optic Rotation Sensor Signal Detection and Processing", Proceedings of SPIE 139, 76, 1978.
Vali et al., Proceedings of SpIE, 76, 110, 1976.
Vali et al, "Fiber Ring Interferometer", Applied Optics, 15, 1099, May 1976.
Martin et al., "Fiber Optic Laser Gyro Signal Detection and Processing Technique", Proceeding of SPIE 139, 98, 1978.
Vali et al., "Fresnel-Fizeau Effect in a Rotating Optical Fiber Ring Interferometer", Applied Optics, 16, 2605, Oct. 1977.
Vali et al., "Fresnel Drag Effect Ion Fiber Optic Gyroscope", NEACON, May 18-19, 1978.
Moss et al, "Photon-Noise Limited Transducer for Gravitational Antenna", Applied Optics, 10, 2495, 1971.
Vali et al., "Fiber Laser Gyroscopes", Univ. of Utah Research Institute.
Stone, J. M. "Radiation and Detectors", McGraw-Hill, N.Y. 1963, pp. 405-408 and p. 412.
Smith et al., "Ring Lasers: Principles and Applications" Proc. Is tn. Mech. Engrs., 1968, 1969., vol. 183.
Vali et al., "Ring Interferometer 950 m Long", Applied Optics, vol. 16, No. 2, Feb. 1977, pp. 290-291.

Primary Examiner—John K. Corbin
Assistant Examiner—Bruce Y. Arnold
Attorney, Agent, or Firm—George W. Finch; Donald L. Royer; John P. Scholl

[57] ABSTRACT

A beam of light is split and introduced into different ends of a light path whose rotation is to be sensed. At least one frequency shifter is placed in the light path to affect the frequency difference of the two beams so as to introduce or adjust a nonreciprocal phase shift. The beams are then mixed back together and the resultant beam is detected and analyzed by suitable circuitry to provide an output indicative of rotation of the light path.

74 Claims, 35 Drawing Figures

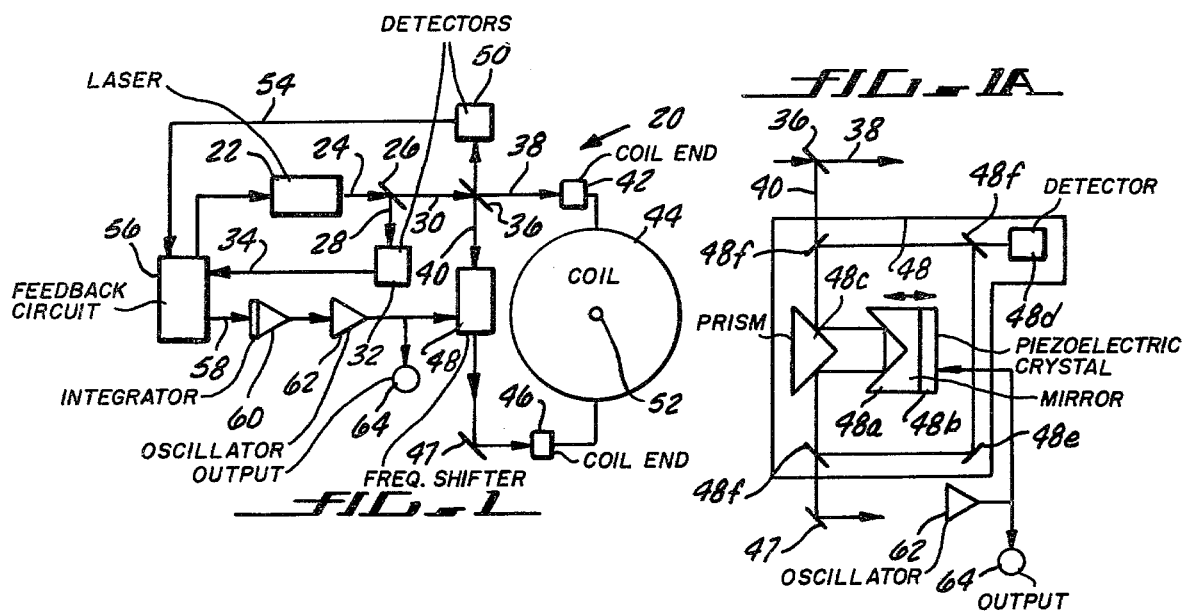
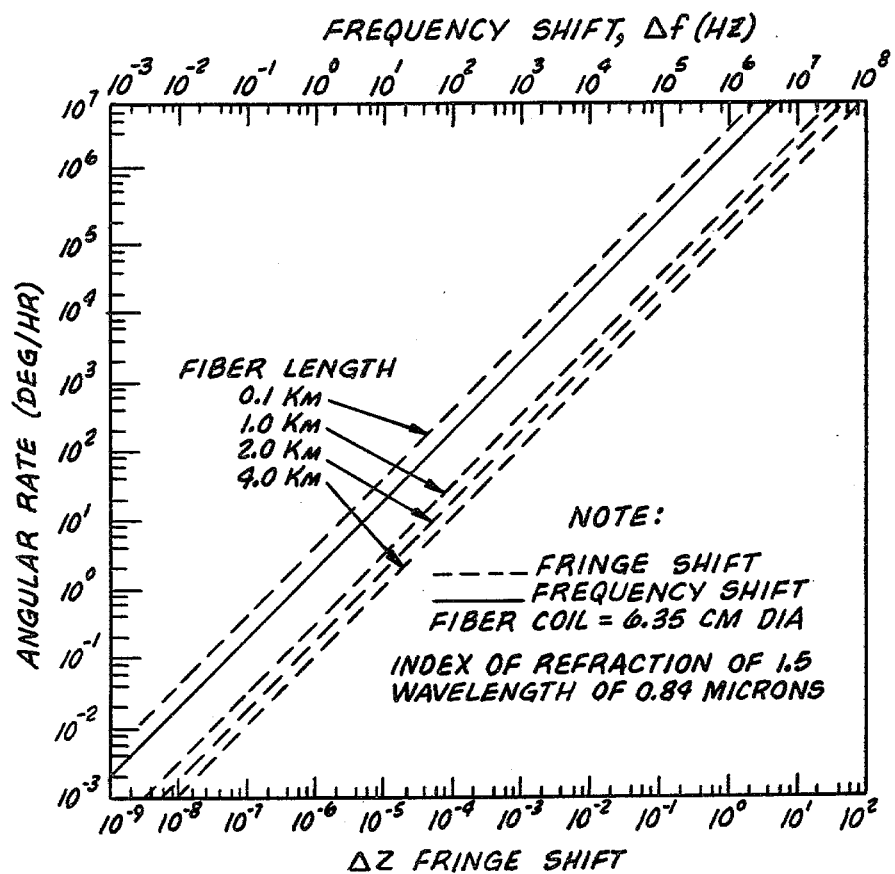

DATA POINTS WITH ERROR BARS
FIBER COIL = 27 CM DIA
WAVELENGTH OF 0.63 MICRONS
INDEX OF REFRACTION OF 1.5

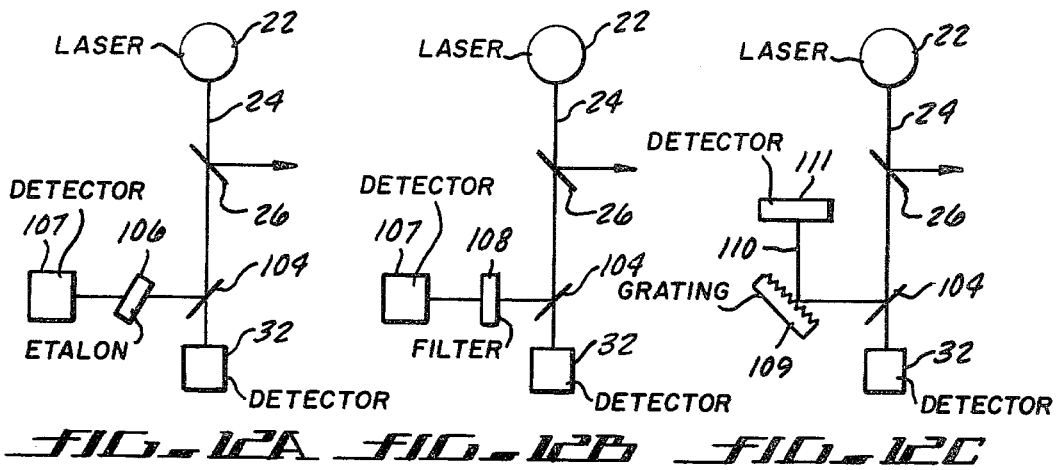
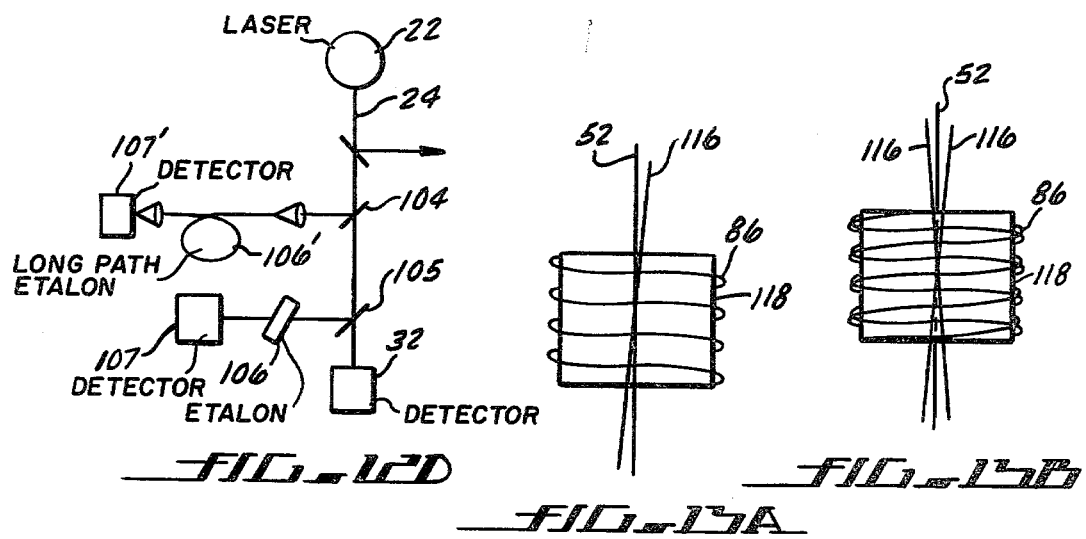
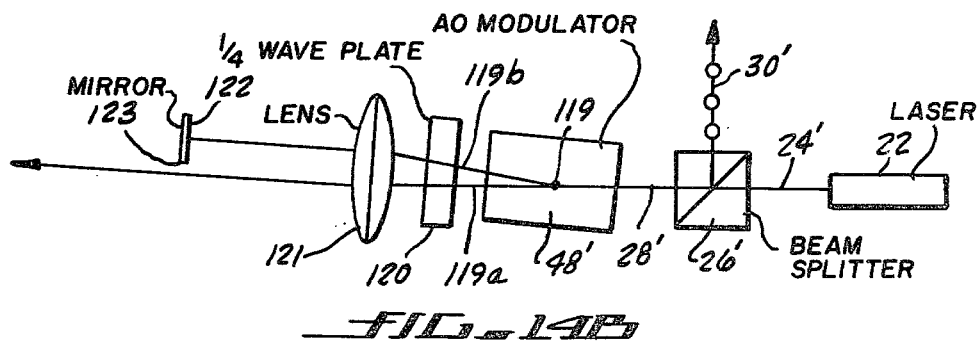

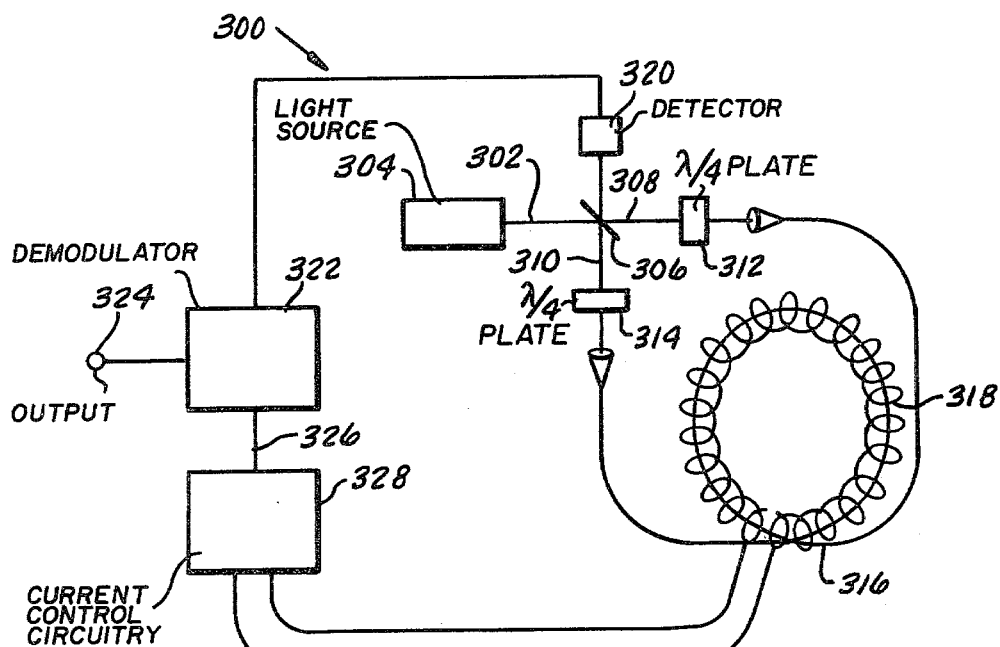
FIG. 22
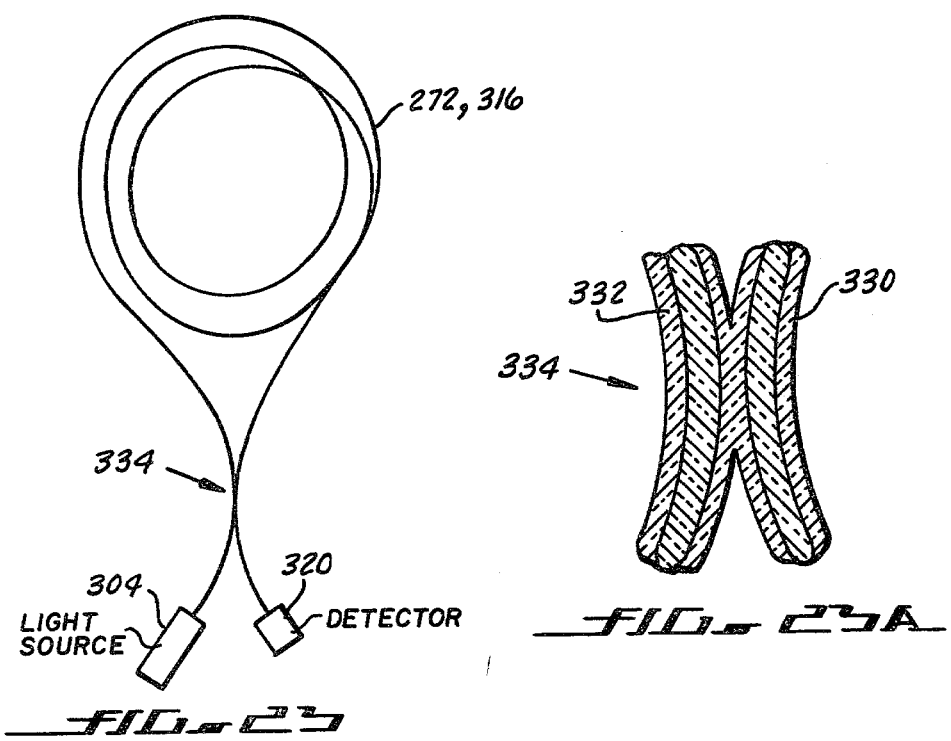
FIG. 23
FIG. 23A

PHASE NULLING OPTICAL GYRO

BACKGROUND OF THE INVENTION

State of the art mechanical gyros are available for most uses but their high cost, long warm up time, low reliability and problems associated with acceleration make implementation of solid state inertial sensitive systems such as laser gyros attractive. To be acceptable for a broad range of products such gyros must have a large dynamic range. For example, a gyro that is to be used in an inertial navigation system for a manned aircraft, sufficiently accurate to accomplish the functions of navigation, control and support of weapons delivery, and reconnaissance, should be capable of sensing a peak angular input rate of about 400°/sec while on the low end, its bias instability should be better than 0.01° deg/hr. This represents about eight orders of magnitude dynamic range and is a primary navigational grade laser gyro performance objective. Secondary, but still important performance goals are: scale factor errors consisting of scale factor stability, scale factor asymmetry and scale factor linearity of not more than 10 ppm; a sensitivity to acceleration which is not greater than 0.01° hr/g; an operating temperature of from 32° F. to 160° F.; axis alignment instability of not more than 10 arc seconds, and the ability to withstand linear accelerations up to 10 g.

Concepts for inertial sensing based on ring lasers have thus far exhibited the best performance. For example, a ring laser gyro is available which employs a mechanical method known as dithering to circumvent the lock-in problem characteristic of ring laser gyros at low rotation rates. Although this gyro has exhibited the best performance of those gyros presently available, the use of mechanical dithering forsakes the potential advantages of a genuine solid state system. This prior art gyro is also large and costly since it has unitized construction and requires ultra high quality optics. The other presently available ring laser gyro is based on a magneto-optic mirror which acts as an electronic bias away from the lock-in zone, allowing low rotation rate operation. It is smaller and less costly than the previously mentioned mechancially dithered ring gyro. Its performance is not as good and its cost remains high while its prospect for cost reduction due to production economics appears low.

Other laser gyros have been proposed including ones wherein effort has been made to introduce a Faraday rotator as a bias element into the ring laser cavity. However, extreme thermal and magnetic sensitivity of such a device makes it questionable as to whether it will ever be developed far enough to meet the performance requirements outlined above. There also presently are investigators in the art pursuing a multioscillator (four mode) ring laser concept based on the use of a quartz crystal to split right and left hand circularly polarized modes in frequency. Each of these modes is split once again by a Faraday element. Each set of circularly polarized light beams is then mixed to obtain a frequency output dependent upon rotation rate. While the multioscillator approach differs from the two commercially available gyros mentioned above, there does not appear to be any reason to expect substantial reductions in size and cost by adopting a system that is more complex in terms of optical components and eventual readout. It is unlikely in the future that any of the aforementioned laser gyros or concepts will meet the desirable attributes of having high accuracy, small size, and low cost.

U.S. Pat. No. 3,879,130 by Greenstein discloses a ring laser gyro based on a saturable absorber gas element within the ring cavity which offers potential advantages in that outstanding bias stability can be achieved through the action of the saturable absorber gas. Also, operation in the preferred 3.39 um line of helium-neon, which has extremely high gain, results in a potentially smaller, high performance ring laser gyro. Although Greenstein's ring laser gyro has potential competitive advantages over those currently in development, it suffers many of the same problems which characterize prior art ring laser gyros, namely long development time, high grade and consequently expensive optics, and a fundamental size limitation due to the gain of the neon gas lasing medium.

Passive cavity laser gyro configurations unlike ring laser gyros have only recently been investigated primarily due to the late availability of single mode fibers of reasonably low attenuation. One such device utilizes the difference in bandpass generated by an etalon measured in two different directions by counterpropagating beams. Its shortcoming is it cannot meet the navigational grade gyro requirements because of limited q (or Finesse) in real etalons. With this last gyro as an exception, all known actively researched efforts in passive cavity laser gyros use counterpropagating beams which pass through a single mode fiber coil.

Some investigators have demonstrated that a fringe pattern can be generated through the mixing of two counterpropagating beams in a single mode fiber optics coil. Rotational motion of the fiber coil results in a phase shift between the two beams and a consequent change in the intensity of the central fringe. One device uses relative intensity measurements to determine rotation rate and since it is difficult to make measurements of intensity to much better than 0.01%, the dynamic range of such device is quite limited. Efforts by other groups have involved the development of means whereby the ability to read out the phase difference of counterpropagating beams can be enhanced. However, they are still fundamentally limited in dynamic range because they basically are analog measuring devices.

From this brief overview of the prior art devices, two major conclusions can be drawn. Firstly, ring laser gyros which have been under development for fifteen years probably will not undergo substantial reductions in size or cost in the foreseeable future and secondly passive cavity laser gyros and in particular those based on fiber optics offer little hope of obtaining the performance levels of the existing ring laser gyros without an inventive breakthrough. What has been required is a low-cost, breakthrough. What has been required is a low-cost, solid-state laser gyro with a wide dynamic range capability so that in the long term its cost and size allows it to be a replacement for not only the high quality gyros presently required in inertial guidance systems but ultimately for all purposes in which an electrical inertia indicating signal is required.

BRIEF DESCRIPTION OF THE PRESENT INVENTION

In one of the simplest forms of the present gyro, light from a single mode, single frequency, laser diode is directed to a beamsplitter. One part of the beam reflects onto a detector that monitors amplitude fluctuations of the laser output and provides this information to an electronic feedback system which acts to normalize the output signal as well as regulate the output of the laser diode. The second portion of the beam is intercepted by another beamsplitter and is split and directed into each end of a fiber optic coil so that two counterpropagating beams are present therein. Upon rotation of the coil, about an axis normal to the plane in which it lies, the relative path lengths of the counterpropagating beams are changed. That is, upon clockwise rotation, the path length of the clockwise beam is lengthened while the path of the counterclockwise beam is shortened. Consequently, the two beams move out of phase with one another and the phase shift is recorded as an intensity change by a suitable detector once the two beams are combined by the second beamsplitter. A frequency shifter, which may be an acoustic-optic modulator, is positioned at one end of the fiber optic coil so that both the clockwise and counterclockwise beams are frequency modified thereby. This generates a nonreciprocal phase shift so as to offset any phase shift generated by rotation. The signal required to null out a rotation caused phase shift detected at the second detector is fed into the electronic feedback system and relayed to an integrator and voltage controlled oscillator resulting in a change in frequency at the output of the oscillator. The frequency change is the output of the device which is proportional to the change in rotation rate.

The present phase nulling laser gyros can use: lasing or light emitting diodes; one or more frequency shifters which may be acousto-optic modulators, electro-optic modulators, reflectors driven by piezoelectric material to produce Doppler shifts or any other devices which change the frequency of incident light; and a fiber optic coil or a glass block with reflective surfaces, to produce, in combination with appropriate optics and electronics, a frequency output proportional to rotation rate that is nulled in a closed loop system. Thus, the present gyro combines the best features of the active cavity and passive cavity laser gyros (frequency output and solid state, respectively), while bypassing their shortcomings (lock-in band and limited analog dynamic range, respectively). Furthermore, rapid progress in performance improvement and cost reduction in laser and light emitting diodes as well as fiber-optics components is assured by heavily funded programs in the telecommunications industry. The acousto-optic modulators can be used in the present gyro to yield high performance and dynamic range, while generating a digital, rather than analog output for ease of integration with using systems. Means can be provided to track or compensate for errors introduced by frequency drift of the laser diode and temperature drift of the optical components and fiber optics, as well as provide for maximum acoustic isolation of noise due to optical feedback into the laser or light emitting diode.

As will be shown hereinafter, the aforementioned configuration results in a fiber optic laser gyro which can provide high performance in a small size and is producible at low cost to meet a variety of system requirements. The present gyro offers the high dynamic range and performance levels of ring laser gyros and also takes advantage of the cost and size reduction of parts developed for the fiber optics communication field. The use of acousto-optic modulators yields the high performance and dynamic range. Normally, the system has a digital rather than analog output for ease of integration with using systems, electronic feedback which optimizes the system so as to provide maximum acoustic isolation while detecting rotation and means to track and compensate for errors introduced by frequency drift of the laser.

It is therefore an object of the present invention to provide means for sensing inertial changes.

Another object is to provide a gyro device with large dynamic capability and small error over a wide operating range.

Another object is to provide means to replace mechanical gyroscope based inertial guidance systems.

Another object is to provide a high performance inertial sensing device which can be constructed in a small package of solid state components whose cost is relatively low.

Another object is to provide an inertial sensing device whose cost will steadily decrease while performance levels increase as laser and light emitting diodes and fiber optic components are mass produced by the telecommunications industry.

Another object is to provide a solid state gyro whose major error producing effects can be measured, controlled, reduced and compensated so that a high performance device results.

These other objects and advantages of the present invention will become apparent to those skilled in the art after considering the following detailed specification which describes preferred embodiments thereof in conjunction with the accompanying drawings wherein:

BRIEF DESCRIPTION OF THE DRAWINGS

FIG. 1 is a diagramatic view of one embodiment of the present invention;

FIG. 1A is a diagramatic view of a optical frequency shifter;

FIG. 5 is a graph of parametric performance of the present device in relation to fiber length;

FIGS. 12A, 12B, 12C and 12D are diagramatic views of means to eliminate certain thermal effects on the output of the device;

FIGS. 13A and 13B are diagramatic views of the fiber optic coils showing means to assure the axis thereof sensitive to rotation is in proper alignment;

FIG. 14A shows a diagram for acousto-optic modulation deflection tracking while FIG. 14B shows a diagram of means to eliminate acoustic-optic modulator deflection;

FIG. 22 shows schematically a very low cost embodiment of the present invention based on Faraday effects of the optical fiber;

FIG. 23 shows a beamsplitter device constructed from the fiber in a fiber optic coil; and FIG. 23A is a detail view of the beamsplitter portion of FIG. 23

DETAILED DESCRIPTION OF THE SHOWN EMBODIMENTS

Figure 2A:
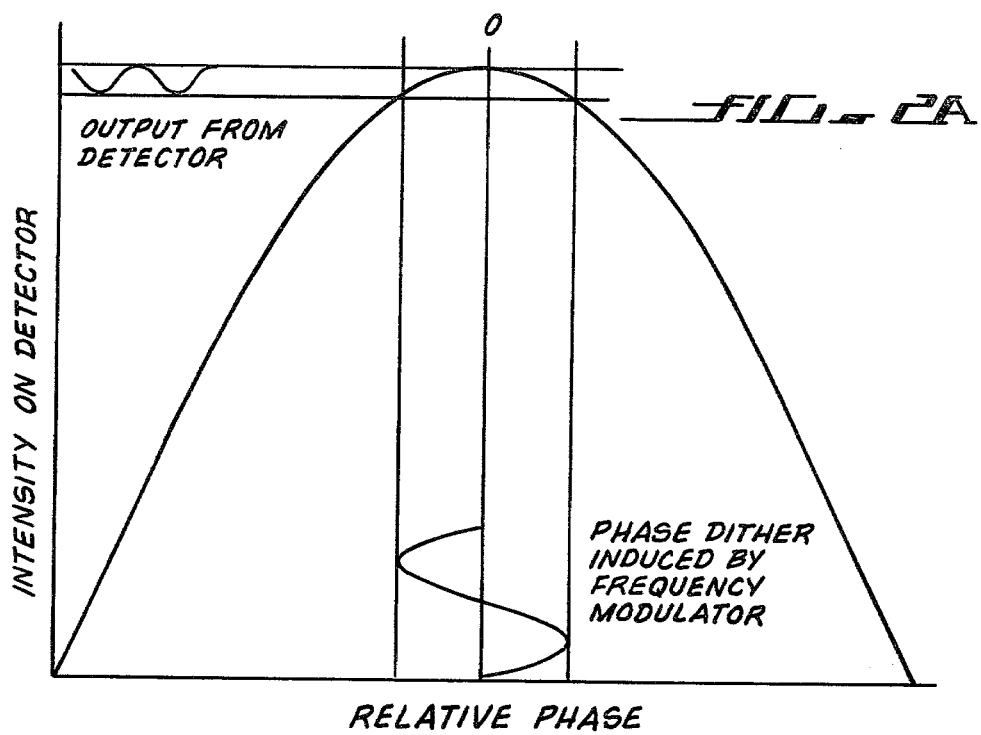
FIGS. 2A and 2B are graphical representations of signals detected during open loop operation of the phase nulling laser gyro with no rotation and upon rotation respectively.
Figure 2B:
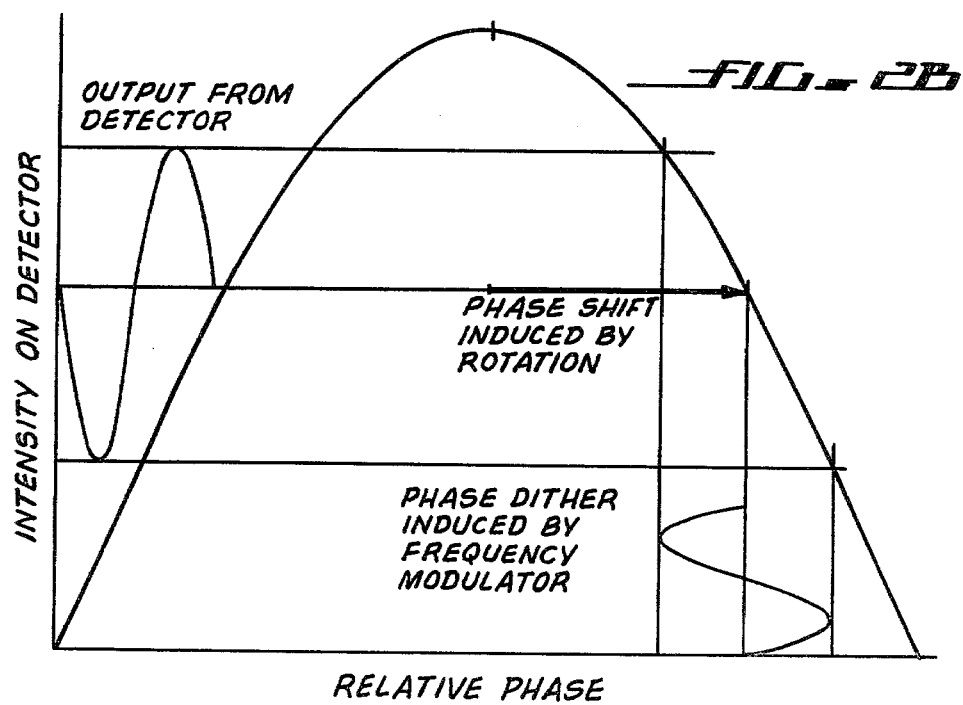

Referring to the drawings, more particularly by reference numbers, number 20 in FIG. 1 refers to a simple form of a phase nulling laser gyro shown in schematic form. The gyro 20 includes a laser 22 whose output is a beam of light 24 which can be at a single frequency, although broadband and multiple light sources are also possible. The beam 24 is directed toward a beam splitter 26 which divides the beam into two beam portions 28 and 30. The portion 28 of the beam 24 is directed onto the light sensitive element of an intensity detector 32 which produces an electrical output 34 indicative of extraneous laser intensity fluctuations of the beam 28 striking the detector 32 and provides a correction signal level normalization as will be described hereinafter, as well as providing feedback control to the output of the laser 22. The other portion 30 of the beam 24 is directed toward a second beamsplitter 36 which divides the beam 30 into two beams, one a clockwise beam 38 and the other a counterclockwise beam 40. The clockwise beam 38 is directed into one end 42 of a fiber optic coil 44 which in certain instances can be replaced by a glass block with reflecting surfaces or a series of mirrors to provide an appropriate light path. The beam 38 after traveling around the coil 44 in a clockwise direction in the orientation of FIG. 1, comes out the opposite end 46 of the coil 44, reflects off a mirror 47, passes through a frequency shifter 48 and through the beamsplitter 36 to a second detector 50. The mirror is only needed when the end 46 is not aligned with the detector 50. The counterclockwise beam 40 passes through the frequency shifter 48 first and then, after reflecting off of the mirror 47, passes into the end 46 of the coil 44 where it travels around the coil 44 in a counterclockwise direction coming out the end 42 and being reflected by the beamsplitter 36 onto the detector 50 also. Therefore, counterpropagating beams which are at different frequencies are present in the coil 44. They are portions of the same beam which should have traveled the same path length unless the coil 44 was rotated. The action of the frequency shifter 48 is twofold. By changing the frequency of one beam relative to the other in the coil 44, a non-reciprical phase shift is generated which can be used to nullify any phase shift due to rotation of the coil 44. The frequency shifter 48 also can provide means to produce an oscillatory relative phase shift or phase dither between the beams 38 and 40 for implementing an AC phase sensitive detection method as shown in FIGS. 2A and 2B.

When the coil 44 is rotated about its axis 52 which is normal to the plane in which the coil 44 effectively lies, the relative path lengths of the counterpropagating beams 38 and 40 are changed; that is upon clockwise rotation of the coil 44, the path length of the clockwise beam 38 is lengthened while the path of the counterclockwise beam 40 is shortened. Consequently, the two beams 38 and 40 exhibit the nonreciprocal phase shift due to the rotation and the phase shift is detected as an intensity change signal by the detector 50. The signal is the first harmonic of the sinusoidal phase dither whose amplitude is proportional to the change in rotation rate as shown in FIG. 2B. The detector 50 produces an electrical signal proportional to the intensity change signal. This electrical signal is fed on output line 54 thereof to an electronic feedback circuit 56 along with the output of the detector 32.

The feedback circuit 56 uses the signal on output line 34 to adjust the laser output and the signal level for differences in the output of the laser 22 and once so calibrated, the signal on line 54 is an indication of the instantaneous change in the amount of rotation of the coil 44 about the axis 52. The feedback circuit 56 includes a synchronous demodulator which rectifies and low pass filters the electrical signal. This output, which represents the rotation rate change of the coil 44 is supplied on output line 58 to an integrator 60 whose output voltage is proportional to rotation rate and is used to control a voltage controlled oscillator 62. Any change of the signal on the output 54 is related to the rotation of the coil 44 rather than to changes of the laser output 22 and results in a change in frequency of the output of the voltage controlled oscillator 62. This output frequency is supplied as the output 64 of the laser gyro 20 to indicate the rotation of the gyro 20 about the axis 52. The output of the oscillator 62 also is fed back to the frequency shifter 48. The frequency shifter 48 thereafter changes the non-reciprocal phase shift so as to offset any phase shift generated by the rotation rate change of the coil 44. The signal required to null out a phase shift on the detector 50 is thereby generated by the electronic feedback circuit 56 and hence the system operates as a closed loop device with the inertial information being produced at the output 64 and also being used to close the loop. This approach using closed loop phase nulling greatly reduces the required dynamic range of the detector 50. Note that although the procedure described herein uses nulling of the first harmonic for rotation rate measurement, it is also possible to adopt another approach, namely nulling of the second harmonic for rotation rate measurement.

The equations below show how, by appropriately choosing the bias point of the phase dither, either a first or second harmonic signal can be used as an error signal to null out rotationally induced effects. Consider first the case of the phase dither being centered about the point at which the relative phase differences of the counterpropagating beams at the detector 50 is zero as has been shown in FIG. 2A. The expression for the intensity, I, seen by the detector for this situation may be expressed as $I = K \cos(\theta_o \sin \omega t)$ where K is a constant, $\theta_o$ is the maximum amplitude of the phase difference and $\omega$ is the frequency of the phase dither. Expanding this relationship renders:

$$I = K \cos(\theta_o \sin \omega t) = K \left[ 1 - \frac{\theta_o^2 \sin^2 \omega t}{2!} + \frac{\theta_o^4 \sin^4 \omega t}{4!} - \ldots \right] \quad (1)$$

so that only even harmonics are present and for values of $|\theta_o| \leq \pi/2$ the second harmonic is the dominant AC term. If the center of the relative phase difference is offset in phase from zero by $\delta = \delta_R + \delta_B + \delta_F$, where $\delta_R$ is the offset due to rotation, $\delta_B$ is the adjustable bias offset and $\delta_F$ is the offset in phase due to the difference in frequency in the counterpropagating beams, then the intensity on the detector 50 may be written as $\cos(\theta_o \sin \omega t + \delta)$ and expanded as:

$$I = K \cos(\theta_o \sin \omega t + \delta) = K [\cos(\theta_o \sin \omega t)\cos\delta - \sin(\theta_o \sin \omega t)\sin\delta] \quad (2)$$

The first term in Equation (2) is identical to Equation (1) multiplied by the constant coefficient $\cos \delta$ and contains only even harmonic terms as has been discussed already. The second term of Equation (2) is a constant term, $-\sin \delta$, multiplying $\sin(\theta_o \sin \omega t)$. Expanding this as:

$$\sin(\theta_o \sin \omega t) = \theta_o \sin \omega t - \frac{\theta_o^3 \sin^3 \omega t}{3!} + \ldots \quad (3)$$

shows that only odd harmonics are due to this term and that for $|\theta_o| \leq \pi/2$, the first harmonic AC term predominates. Thus for this particular arrangement, the first harmonic which would arise due to a shift in relative phase $\delta_R$ due to a rotation rate change can be used as an error signal which may be nulled out by requiring that $\delta = \delta_R - \delta_F = 0$ or equivalaltly $\delta_F = \delta_R$. Alternatively, the phase dither could be biased by $\delta_B = \pi/2$, the relative phase shift at the detector 50 in Equation (2) reducing to the form of Equation (3) with only odd harmonics and in particular the first harmonic being the signal from the detector 50, in the absence of rotation. Offsets in phase due to rotation $\delta_R$ will result in the generation of even harmonics and in particular the second harmonic as in Equation (1) which can be nulled out by requiring $\delta_F = \delta_R$ so that $\delta = \delta_R + \delta_F + \delta_B = \delta_B = \pi/2$.

The fringe shift induced by rotating the gyro 20 is given by:

$$\Delta Z_R = \frac{2\Omega R L}{\lambda c} \quad (4)$$

where $\Delta Z_R$ is the fringe shift induced by rotation, $\Omega$ is the angular rotation rate of the system 20 in radians/sec., L is the length of the fiber optic coil 44, R is the radius of the coil 44, $\lambda$ is the wavelength of the light output of the laser 22, n is the index of refraction of the glass fiber in the coil 44 and c is the velocity of light in free space.

Changes in fringe position due to rotation can be compensated by the effect of the frequency shifter 48. The fringe position compensation can be expressed as:

$$\Delta Z_F = \Delta f \Delta t_D = (nL)/c \quad (5)$$

where $\Delta Z_F$ is the difference in fringe shift caused by a frequency difference of $\Delta f$ between counterpropagating beams 38 and 40 in an optical fiber coil 44 having a time delay $\Delta t_D$. Equating (4) and (5) renders:

$$\Delta f = \frac{2\Omega R}{\lambda n} \quad (6)$$

where $\Delta f$ is in Hz and $\Omega$ is in radians/sec., small error terms due to wavelength, index of refraction and dispersion differences in the two counterpropagating beams 38 and 40 have been dropped.

Equation (6) shows that the frequency shift $\Delta f$ needed to compensate for a rotation rate $\Omega$ does not depend on the length of the fiber coil 44. As an example, a GaAlAs laser diode operated at $\lambda = 0.84$ m in a gyro 20 with a glass fiber coil (n = 1.46), and a radius of 6.35 cm would operate according to:

$$\Delta f = 10^5 \Omega (\Delta f \text{ Hz}, \Omega \text{ rad/sec}) \quad (7)$$

Such a gyro 20 required to perform between $\pm 400°$/sec. would require a voltage controlled oscillator or frequency synthesizer 62 with a bandwidth of 1.4 MHz, which is readily achieved with presently available devices, although the requirement may be reduced through the use of a frequency multiplier.

The accuracy of a gyro 20 over a range of rotation depends upon the ability of the system to detect and nullify small fringe shifts $\Delta Z$. Fringe shifts are proportional to the length of the fiber in the coil 44. Experimentally $4.7 \times 10^{-6}$ fringes have been resolved at 0.63 without acoustic isolation. More precise experiments operating near the shot noise limit have resolved $2.0 \times 10^{-8}$ fringes. With this resolution, $\lambda = 0.84$ μm, R = 6.35 cm, and a fiber coil length L = 4000 m, the lowest detectable rotation rate is $\Omega = 0.002°$/hr.

Figure 3A:
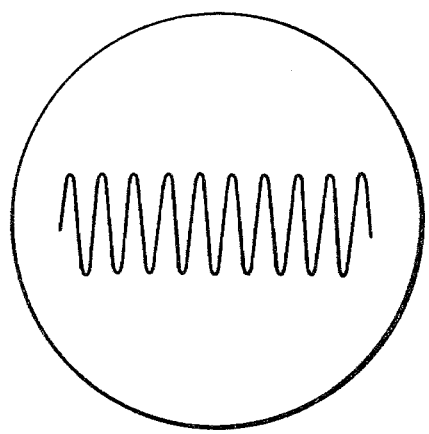
FIGS. 3A, 3B and 3C show experimental open loop detection signals, FIG. 3A showing detection of the first harmonic at 200 Hz for +20°/sec., FIG. 3B showing disappearance of the first harmonic leaving only the second harmonic in the absence of rotation, and FIG. 3C showing detection of the first harmonic at −20°/sec.
Figure 3B:
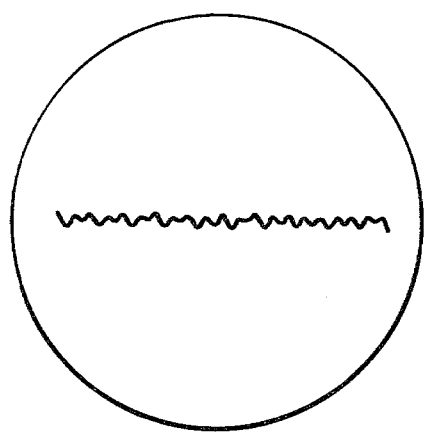
Figure 3C:
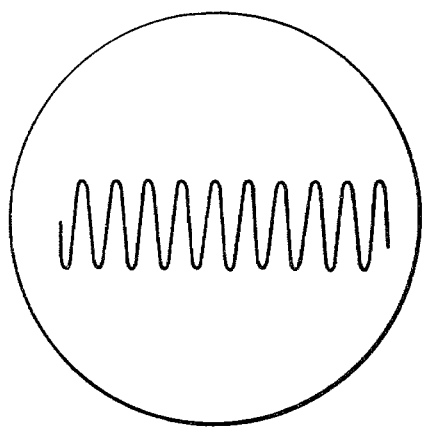
Figure 4:
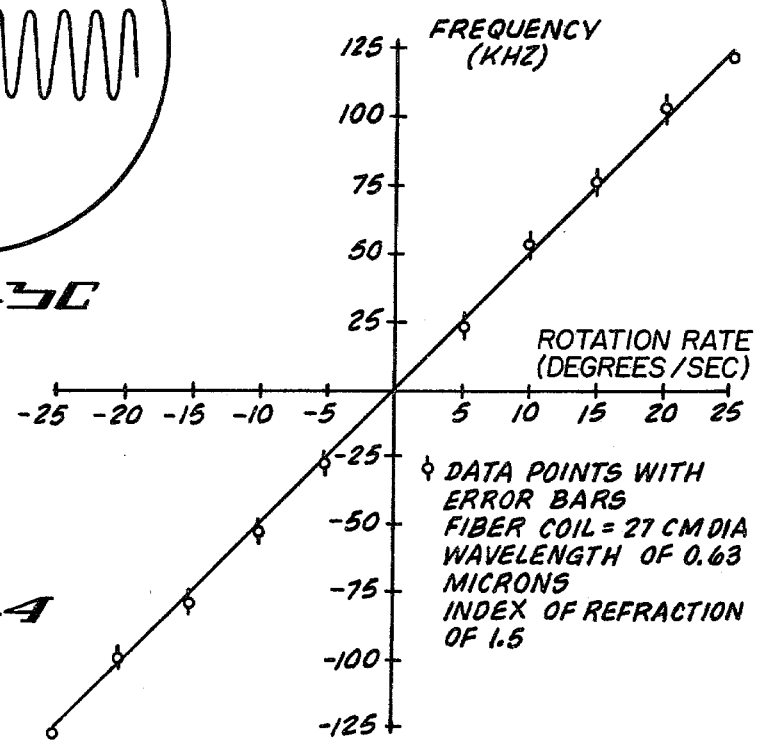
FIG. 4 shows experimental data from a proof of principle demonstration unit of the present invention.
Figure 6:
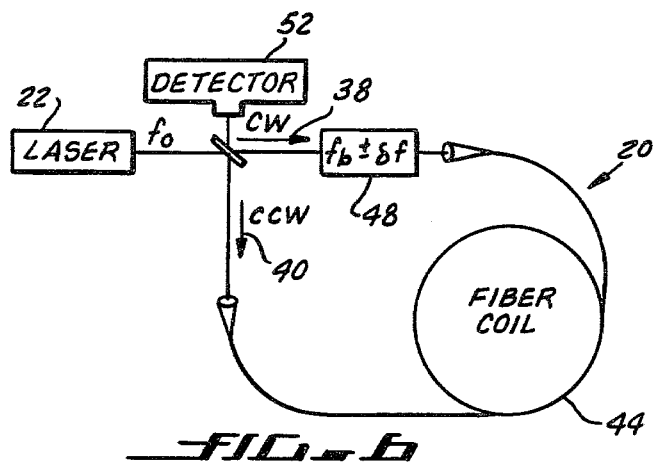
FIG. 6 is a simplified diagram for explanation of a frequency switching technique which can be employed with the present invention.

The gyro system 20 as shown in FIG. 1 was set up on a rate table using a 27 cm diameter coil of single mode fiber of 100 m length. The laser 22 was a single frequency helium neon laser, while the frequency shifter 48 employed was an acousto-optic modulator with a center frequency of 50 MHz and a bandwidth of 10 MHz. The frequency of the acousto-optic modulator was adjusted so that the counterpropagating beams 38 and 40 were in phase on the detector 50 in the absence of rotation. The relative phase of the two beams 38 and 40 was determined by sweeping the modulator 48 over a frequency range of 100 KHz at a 200 Hz rate. When the beams 38 and 40 are in phase, only a second harmonic signal arises as shown in FIGS. 2A and 3B. Operating the gyro 20 in open loop fashion by disconnecting the feedback system, a first harmonic signal arises upon rotation thereof whose amplitude and phase depends on the direction and rate of rotation, as seen in FIGS. 2B, 3A and 3C. Closing the loop, the gyro 20 senses the amplitude and phase of the first harmonic as an error signal to be nulled out. A digital output was obtained on a frequency counter (not shown) measuring the output of the oscillator 62. FIG. 4 is a plot of data obtained from the test unit over a representative range of rotation rates for comparison with the theoretical result of Equation (6). Error bars extending vertically from the data points represent the noise level of the system due to residual FM deviation in the oscillator 62. This noise source limited the detectability of rotation on the low end to 0.5°/sec. Settling time of the rate table employed and winding up of the instrumentation cables restricted useable data to an upper range of 30°/sec.

The frequency shifter 48 which usually is an acousto-optic modulator can be replaced with an alternate frequency shifter such as an electro-optic crystal whose use as a frequency shifter is known or a retroreflector 48a mounted on piezoelectric material 48b to induce Doppler shifts. Such a modification is shown in FIG. 1A with a triangular mirror 48c being used to guide the beams to the retroreflector 48a. Since the retroreflector 48a is moved back and forth toward the mirror 48c, the beams have frequency shifts induced therein as is desired. The form of the voltage waveform driving the piezoelectric material 48b determines the frequency difference $\Delta f$. As an example, constant $\Delta f$, save for small intervals which could be electronically chopped off, could be simulated by applying a sawtooth voltage whose slope is accurately controlled by a feedback system (not shown) from detection of the frequency difference generated in a mixer (not shown) between the output $\Delta f$ from the frequency shifter and a commanded reference value f', and a similar waveform could be used to achieve the same effect when an electro-optic crystal is used. An additional detector 48d with associated mirror 48e and beam splitters 48f is used to monitor the operation of the piezoelectric material 48b.

What follows are details for improving the performance of the gyro 20 by the elimination of error and noise so that high sensitivity, accuracy and the large dynamic range desired can be obtained. FIG. 5 illustrates the calculated fringe and frequency shifts over the angular rate range of interest for a set of typical parameters for the gyro 20. Additional accuracy can be achieved by increasing the resolution of the detection measurement electronics as will be described, lengthening the fiber coil 44, or increasing the radius of the coil. Since single mode optical fibers are available which have an attenuation of 2.5 db/KM at 8400 A° and developmental fibers with attenuation less than 0.7 db/Km have been reported, the potential exists for extremely accurate devices through a combination of longer optical fibers and improved detection electronics.

The two counterpropagating beams of light 38 and 40 are normally arranged to be 180° out of phase at the detector 50 when no bias frequency is applied to the frequency shifter 48 and no rotation rate is present about the axis 52. In order to reduce laser feedback noise, the two counterpropagating beams 38 and 40 may be biased by the nonreciprocal effect of the frequency shifter 48 so that they are exactly in phase to produce the resultant wave shown in FIG. 2A. This operating frequency then represents zero rotation rate. Frequency shifts are proportional to rotation rate.

Figure 7A:
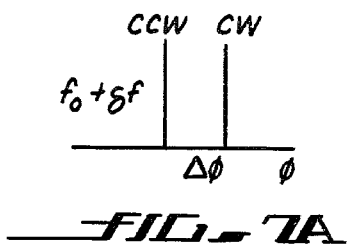
FIGS. 7A, 7B, 7C and 7D show the frequency switching phase relationship of the present device in open loop operation with a switching dither technique.
Figure 7B:
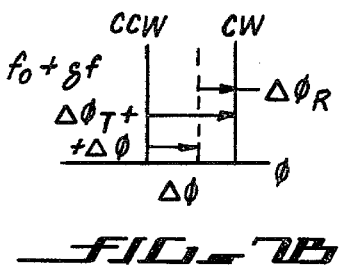
Figure 7C:
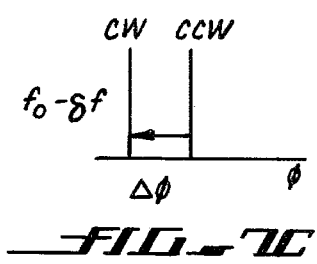
Figure 7D:
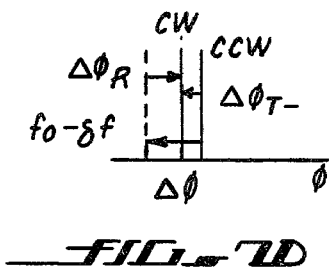
Figure 8:
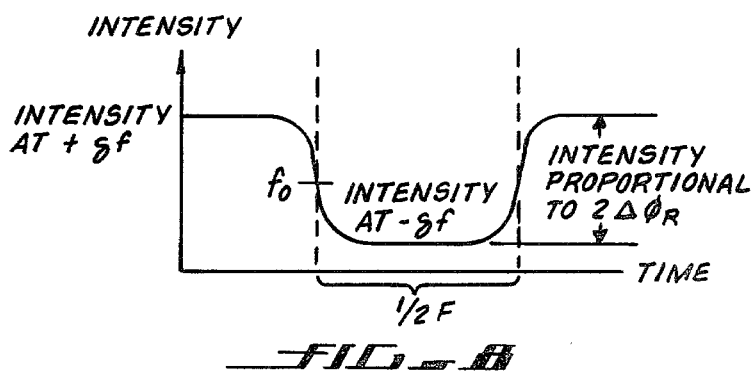
FIG. 8 is a graph of the detected intensity obtained when the frequency switching technique is employed.
Figure 15:
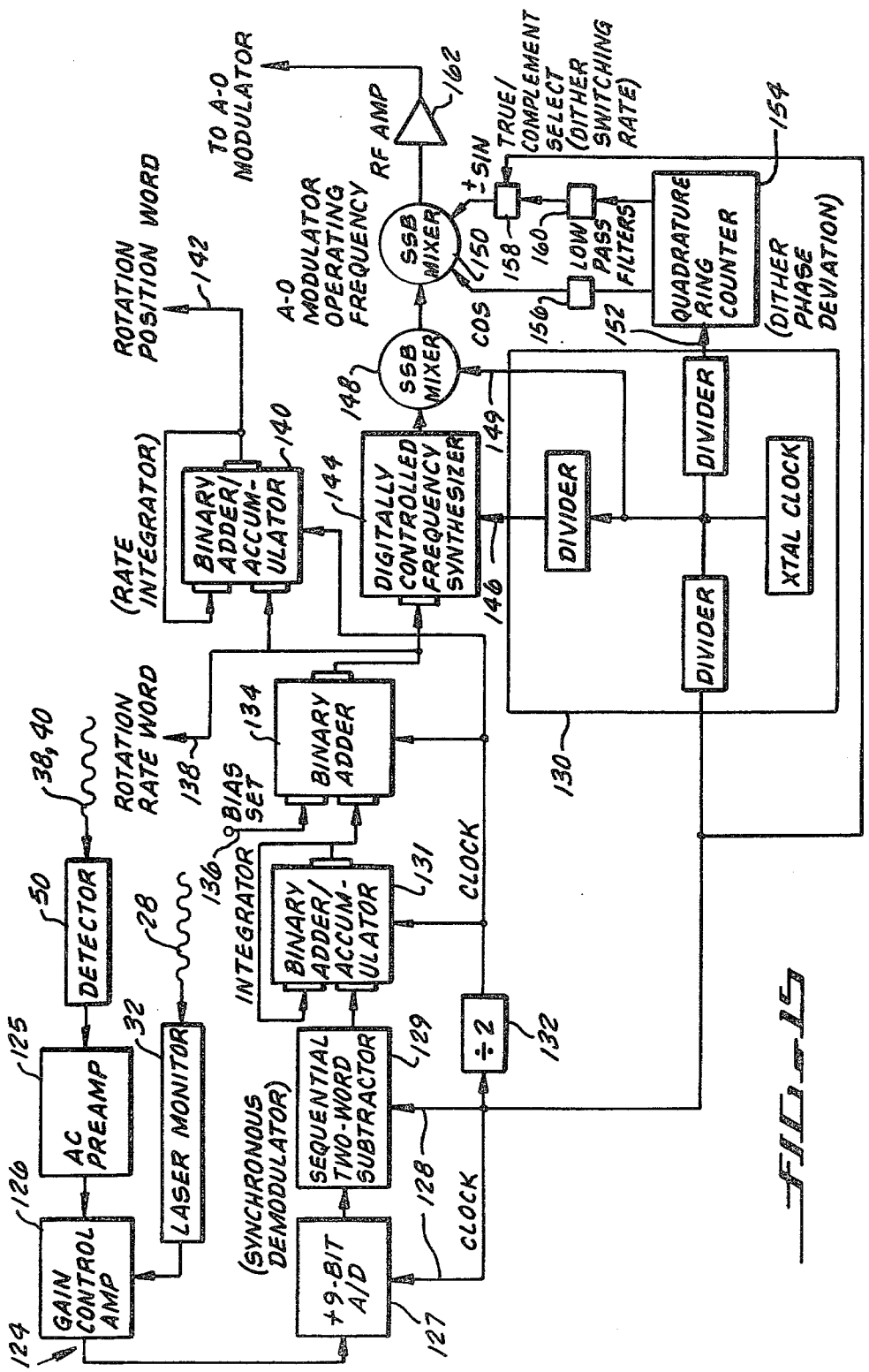
FIG. 15 is a circuit diagram of digital means to provide the electronics for the present invention.

The sine wave dither can be replaced with a square wave or switching dither. In this latter instance, the frequency shifter 48 is repetitively switched by adding an increment, $+\delta f$ and $-\delta f$, to the bias frequency, $f_b$. FIG. 7 illustrate the relative phase position of the clockwise and counterclockwise beams 38 and 40 for this situation. FIGS. 7A and 7C represent the situation without any rotation of the coil 44 about the axis 52. FIGS. 7B and 7D are the cases with a rotation resulting in a nonreciprocal phase shift $\Delta\phi_R$. When the coil 44 is rotated, the relative phase difference between the two beams 38 and 40 increases in one mode, say $+\delta f$, resulting in a total phase change $\Delta\phi_{T+} = \Delta\phi + \Delta\phi_R$ while in the other mode, $\delta-\delta f$, $\Delta\phi_{T-} = \Delta\phi - \Delta\phi_R$, where $\Delta\phi$=phase shift due to $\delta f$, and $\Delta\phi_R$=the phase shift due to rotation. Thus upon switching, the total difference in intensities of the combined waves are proportional to $\Delta\phi_{T+} - \Delta\phi_{T-} = 2\Delta\phi_R$. By introducing a compensation frequency difference $\Delta f_R$, any amplitude change of the resulting wave due to rotation can be nulled out. Therefore, the amplitude due to the waveform generated by the dither will go to zero as illustrated in FIG. 8. The frequency change $\pm\delta f$ is electronically switched and can be performed by mixing the carrier frequency $f_c$ with sin $2\pi\delta ft$ and cos $2\pi\delta ft$ to generate $f_c + \delta f$; and $f_c$ with $-\sin 2\pi\delta ft$, cos $2\pi\delta ft$ to generate $f_c - \delta f$, in a single sideband mixer 150 as shown in FIG. 15.

A mode of operation that has aspects similar to switching involves use of a pulsed laser or light emitting diode 22. The pulsing of the diode 22 would be synchonized with the extreme excursions of the dither and resultant phase differences between adjacent pulses treated in a manner similar to that described in association with FIGS. 7 and 8. The advantages of pulsing are related to expanded choice of light sources, improved lifetime, lower average power dissipation and higher signal to noise ratio.

Figure 9:
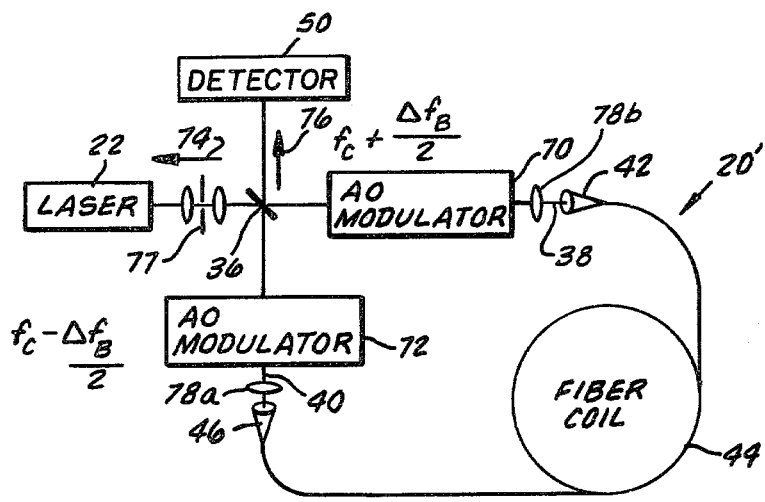
FIG. 9 is a diagramatic view of the light path for a slightly modified gyro constructed according to the present invention.

One of the most severe noise problems likely to be encountered by any fiber optic laser configuration is due to feedback from the optical components or the fiber coil into the light source itself, particularly lasers or light emitting diodes. The design of the present gyro 20 is such that it lends itself to effective isolation of the laser source and various methods can be used to enhance these features for particularly high performance requirements. To understand how feedback into the laser 22 can occur due to the counterpropagating beams 38 and 40 through the fiber coil 44, consider the gyro 20' shown in FIG. 9 wherein the frequency shifter is embodied by two acousto-optic modulators 70 and 72 each positioned adjacent an end 42 and 46 respectively of the fiber optic coil 44. With the same center operating frequency $f_c$ and with the bias frequency $f_B = 0$ the phase shift of beams 74 passing directly back into the laser 22 is given by:

$$\phi_{ccw} = \phi_R + \phi_P + \phi_T \text{ and } \phi_{cw} = \phi_T + \phi_P + \phi_R \quad (8)$$

where $\phi_R$ is the phase change due to reflection off the multilayer dielectric beamsplitter 36, $\phi_P$ is the phase change due to passage through the fiber coil 44 as well as the acoustic-optic modulators 70 and 72 and $\phi_T$ is the phase change due to transmission through the beamsplitter 36. Thus, $\phi_{cw} = \phi_{ccw}$ and the two beams add constructively resulting in all the power being fed back into the laser 22. The light in the beam 76 to the detector 50 consists of:

$$\phi_{ccw} = \phi_R + \phi_P + \phi_R \text{ and } \phi_{cw} = \phi_T + \phi_P + \phi_P \quad (9)$$

and $\phi_{cw} - \phi_{ccw} = 2(\phi_T - \phi_R) = \pi$, since a bright fringe in beam 74 results in a dark fringe in beam 76. It should be noted that the use of metal beamsplitters may be advantageous, with the difference between phase shifts upon transmission and reflection chosen to appropriately bias the system 20. For the purpose of isolating the laser 22, it is desirable to operate the acousto-optic modulators 70 and 72 with a fixed frequency bias $f_B$ sufficient to induce a phase change of $\pi$ between the counterpropagating beams 38 and 40, in which case a dark fringe is directed back into the laser 22 and a bright fringe moves onto the detector 50. Due to the action of the gyro 20° to null out changes due to rotation of the coil 44 thereof, the system is held in this most stable position. The other major advantage of using the acousto-optic modulator approach as shown in FIG. 9 is that any light which is fed back to the laser 22 from the optical components in the vicinity of the fiber optic coil 44 will have been shifted by $2f_c$, if two modulators are placed symmetrically on either side of the fiber coil as shown in FIG. 9, where $f_c$ is the carrier frequency of the acoustic-optic modulators 70 and 72. This method of moving the backscattered light off the emitted frequency of the laser source strongly reduces feedback noise.

It should be noted that a single acousto-optic modulator configuration, as is shown in FIG. 1 accomplishes the same result in that a fixed frequency bias $f_B$ can be produced and the backscatter light is frequency shifted although by $f_C$ instead of $2f_C$. One of the main advantages of using two acousto-optic modulators is that both can be driven off the same carrier frequency source and arranged so that errors in $f_C$ do not result in errors in the output of the gyro 20. FIGS. 9, 18, 19 and 20 show such an arrangement.

Figure 10:
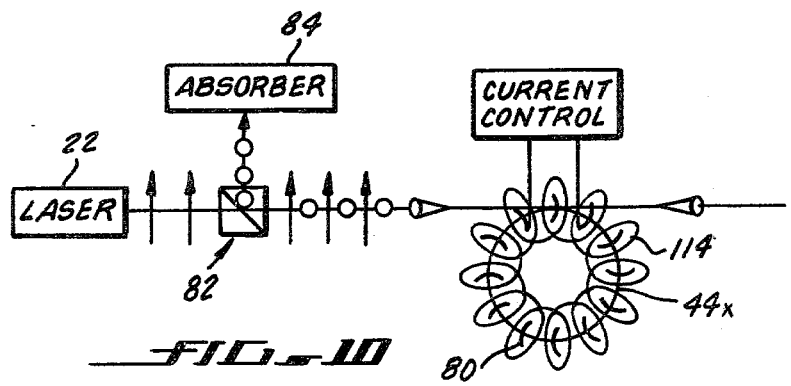
FIG. 10 is a diagramatic view showing Faraday effect elements to reduce laser feedback.
Figure 16:
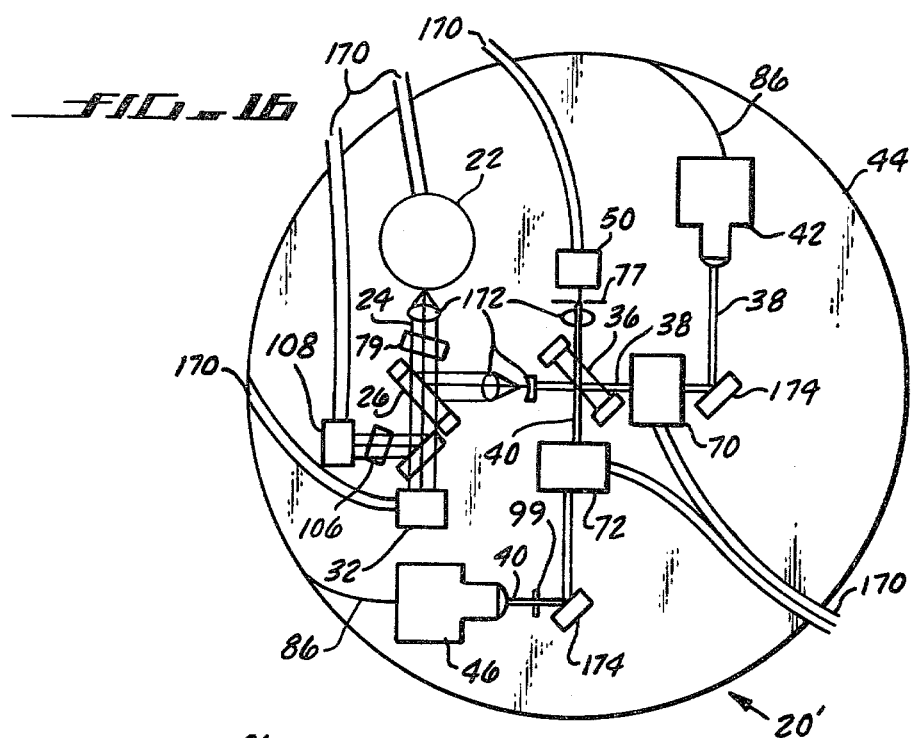
FIG. 16 is a top view of the present laser gyro configured within a 5 inch diameter ring of optical fiber.

A number of optical means can also be employed to reduce noise levels due to laser feedback. For example, the light from the laser diode 22 may be focused through a small pinhole 77 (FIG. 9). By defocusing the coupling lenses 78a and 78b, light directed back toward the laser 22 is not tightly focused at the pinhole 77 and consequently the return light reaching the laser 22 is greatly reduced. A second, simpler method involves the insertion of a neutral density filter 79 after the output of the laser 22 (FIG. 16). If the transmission of the filter 79 is T, then the backscattered feedback into the light source 22 is less than $T^2$, which is less than T since $T<1$. Therefore, feedback is reduced more than the signal level. Finally, a more sophisticated approach can be used, as shown in FIG. 10, wherein a fiber optic Faraday optical isolator is employed. This includes a toroidal winding 80 about a second fiber coil 44x through which suitable current is provided so that a one-way 45° polarization rotation occurs. By placing a polarized beamsplitter 82 in the path of the beam back to the laser 22, a 1000:1 two-way isolation can be achieved. The polarizing beamsplitter 82 reflects the returning beam to an absorber 84 due to the change in polarization thereof caused by the passing of the beam through the coil 44x into the gyro and scattered and returned back through the coil 44x.

Figure 11A:
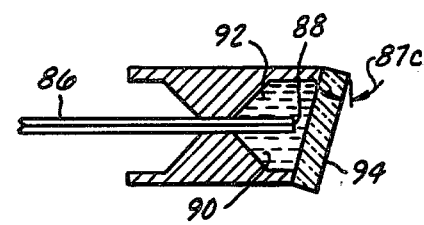
FIGS. 11, 11A and 11B are enlarged detailed views, partially in cross-section, of means to eliminate reflection from the end of the optical fiber.
Figure 11B:
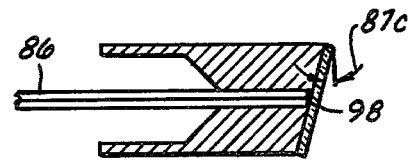
Figure 11:
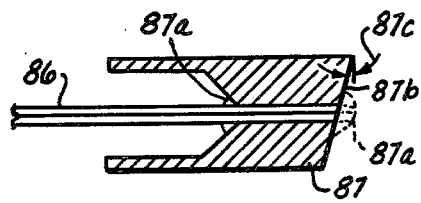

To achieve optimal coupling, the light from the laser 22 must be tightly focused onto the optical fiber end. If the ends of the fiber are normal to the axis of the input beams, backscatter will result from two sources, namely from the front face of the fiber itself and secondly from reflection off the opposite fiber end due to light traveling the length of the fiber and being reflected back. There are a number of ways to eliminate this problem, including cleaving or polishing the ends of the fiber at an angle. FIG. 11 illustrates how the fiber 86 is potted into a ferrule 87 which is held at the desired angle with epoxy 87a. The epoxy 87a and the optical fiber 86 which protrude beyond the face 87b of the ferrule 87 and are ground off and polished to form a good quality optical surface at the desired angle 87c. An alternative to this approach is shown in FIG. 11A. The fiber 86 is mounted so that its end 88 is positioned in a cavity 90 filled with index matching fluid 92. The cavity 90 is sealed with a good optical quality window 94 mounted at an angle 87c to the fiber end 88. A second alternative is shown in FIG. 11B. Here optical cement 98 has been used to bond the fiber end 88 in place instead of the index matching fluid 92.

Single mode optical fibers, such as fiber 86, exhibit birefringence to some degree. The birefringence can be corrected in the present gyro 20 through the use of optical waveplates 99 (FIG. 16). However, the drift of birefringence over time or temperature can be a problem which could, of course, be eliminated by readjusting the waveplates 99. If the drift in a given instance is too severe for passive compensation, it can be eliminated entirely through the use of slightly elliptical or stressed single mode fibers which propagate a preferred polarization.

Low frequency vibrational effects can be controlled by constructing the present gyro 20 as a rigid body. Higher frequency acoustic noise is minimized by the symmetric nature of the present gyro 20 in FIGS. 19 and 20, as well as means to reduce acoustic feedback into the laser 22 described in association with FIGS. 9 and 10.

To understand thermal effects on the output of the device 20, consider Equation (6) which gives the output of the gyro 20 as frequency in terms of rotation rate. Note the scale factor $2R/\lambda n$ does not depend on the length of the fiber 86 nor on the relative intensity of the counterpropagating beams 38 and 40. Consequently, thermal effects which result in expansion or contraction of the length of the fiber 86 have no direct effect. Drift of birefringence due to temperature changes may result in slight degradation of the fringe pattern intensity with a very slight loss in sensitivity, but this does not effect bias or scale factor stability. Thermal effects which offset scale factor and bias stability include changes in the coil radius R, the index of refraction n and $\lambda$. Fortunately, expansion of R with temperature for composite substrates can be made very small and repeatable $(0.5 \times 10^{-6}/°C.)$. Drift of n with temperature is also small, and a thermal sensor can be implemented to sense temperature changes to provide a temperature correction factor for the electronics 56. Wavelength shift of the laser 22 is the most likely temperature effect. To eliminate this shift a simple frequency tracking monitor 100 can be employed. As the wavelength of the laser 22 shown as a laser diode in FIG. 12A drifts with temperature, its output 24 having been split by a beamsplitter 104 is monitored through a wide bandpass low finesse etalon 106 is addition to being monitored by the detector 32. The etalon 106 is a thin optical flat of quartz that exhibits a stable transmission variation as a function of wavelength. The frequency shift is monitored by comparing the output intensity of the laser 22 as seen at detector 32 with that seen by a detector 107 behind the etalon 106. FIGS. 12B and 12C exhibit alternative techniques for tracking wavelength drift of the laser 22. FIG. 12B employs a system similar to 12A except that the etalon 106 has been replaced by an interference filter 108, so that the transmission variation as a function of wavelength can be used to determine the operating wavelength of the laser 22. FIG. 12C uses a grating 109 which may be either reflective or transmissive, the dispersion of the grating 109 causing an angular deflection of the laser beam 110. This deflection results in a change of the position at which the beam 110 impinges upon the position sensitive detector 111. The output from the detector 111 which indicates the position of the beam 110 also indicates the wavelength of the laser 22 as angular deflection of the beam 110 from the grating 109 is proportional to the wavelength. FIG. 12D uses a short pathlength etalon 106 or interference filter in combination with a long pathlength etalon 106' which might be formed by an optical fiber with partially reflective faces and another detector 107' and beamsplitter 104'. This would provide both wide and narrow passbands for accurate tracking over a wide tuning range, using the narrow passbands for accuracy and the wide passband to identify on which of the narrow passbands the device is operating. The same methods shown in FIGS. 12 are useful in monitoring the operation of light emitting and multimode laser diodes.

Magnetic shielding may be used to eliminate external interference caused by spurious magnetic fields. These fields could induce Faraday rotation within the fiber coil 44. Since the coil 44 preferably is contained in a small thickness toroidal volume, this is relatively easy to shield by a combination of thin ribbons 114 (FIG. 10) of hard and soft magnetic shielding material wound over the torus shaped coil 44.

When winding the fiber coil 44, it is desirable to avoid sensitivity to rotations about any axis 116 (FIG. 13A) not parallel to the axis 52 normal to the fiber coil plane. To assure this result, the fiber coil 44 should be wrapped with as many turns spiraling up as spiraling down, as shown in FIG. 13B. When the optical fiber 86 is wound on a drum 118 and spiraled in only one direction, it is most sensitive to rotation about an axis 116 not parallel to the axis 52 of rotation of the drum 118 which also should be the axis of the coil 44. By winding the fiber coil 86 in a spiral manner, both up and down the drum 118, the two sensitive axes 116 and 116' of the coil combine so that the sensitive axis of the coil 44 is the desired axis 52 of the drum 118.

Figure 14A:
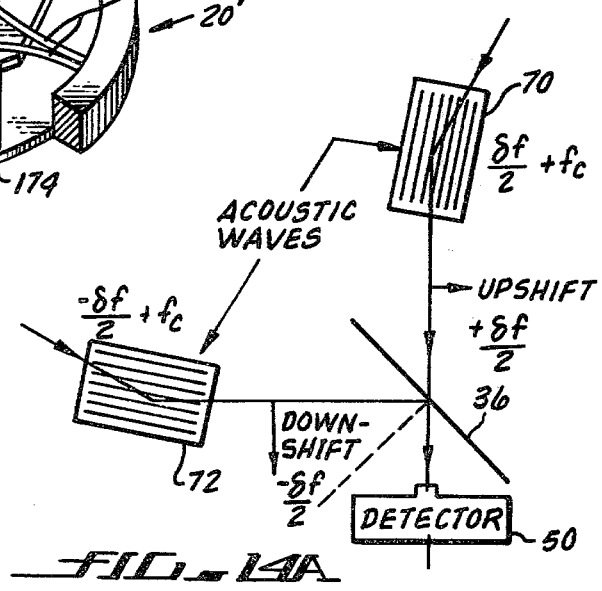

With two acousto-optic modulators 70 and 72 installed in the gyro 20, the two output beams will "track" one another and mix properly on the detector 50. Improper placement, however, could result in the two beams being offset as a function of the compensating frequency $\Delta f$. In FIG. 14A the proper placement of the modulators 70 and 72 is shown.

Second means as shown in FIG. 14B have been devised so that the effect of beam deflection from the acousto-optic modulators can be suppressed, eliminating possible errors due to coupling into the optical fibers of the system 20 and mixing of the output beams.

The vertically polarized laser beam 24' from the laser 22 is passed through a polarizing beam splitter cube 26' oriented such that the vertical polarization passes staight through, the designation "vertical" being arbitrary as the components can be adjusted to accomodate any polarization. The beam 28' then enters the acousto-optic modulator 48' and the zero-order and 1st order diffracted beams 119a and 119b from their apparent origin 119 in the modulator 48' pass through a quarter-wave plate 120 oriented 45° to the vertical polarization. The resulting circularly polarized beam passes through a positive lens 121. The two beams exit the lens 121. A plane mirror 122 with a well-defined edge 123 or a plane mirror with a stop in front of it, is placed behind the lens 121 such that the 1st order beam 119b is reflected back on itself through the lens 121 while the zero-order beam 119a is not reflected from the mirror 122 and is lost. the 1st-order beam 119b, now having opposite circular polarization to its initial state at the lens 121 because of reflection from the mirror, traverses the quarter-wave plate 120 again and emerges linearly polarized but orthogonal to the output beam 24' of the laser 22. The beam 119b passes back through the acousto-optic modulator 48' and is split into zero and first order beams. The zero order beam is lost while the first order beam emerges colinear with the original beam 28'. The zero-order beam is lost beacuse it occurs at a different angle from the first order beam and therefore is not focused directly on the core of the fiber by the coupling lens. It is then reflected by the polarizing beamsplitter cube 26' due to its change in polarization resulting in the output beam 30'. Any angular deflections due to the acousto-optic modulator 48' are cancelled in passing through the modulator twice.

Note that the process of introducing counterpropagating beams of different frequencies by such means as that described in association with FIG. 14B can be used as means to bias a ring laser gyro circumventing the "lock-in" problem characteristic of such devices.

The quality of the optics of the gyro 20 may be such that a small nonreciprocal phase shift is induced by the optical components themselves. This error is a fixed bias error and can be offset by slightly adjusting the bias frequency of the acousto-optic modulators 70 and 72.

Aside from all other noise sources and disturbances discussed above, which may be reduced or eliminated as described, quantum noise remains to set a lower limit on sensitivity for the device 20. The RMS phase is given by:

$$\phi = \left( \frac{2h\nu}{Q\epsilon\tau P} \right)^{\frac{1}{2}} \tag{10}$$

where:
 h$\nu$=photon energy ($=2.37\times10^{-19}$j at 0.84)
 Q=detector quantum efficiency ($=0.6$)
 $\epsilon$=optical efficiency
 P=power of laser diode
 $\tau$=integration time The factor of 2 arises from demodulation loss. The optical efficiency $\epsilon$ is given by the product of the fiber optics transmission, the coupling efficiency, the acoustic-optic modulator efficiency and the optics efficiency. For a 4 km coil of 2.5 db/km fiber, these terms are respectively about 0.1, 0.5, (0.7)$^2$, and 0.8, giving=0.02. For a 5-mw laser diode, and $\tau=1$ sec, solving Equation (10) results in $\Delta\phi=8.9\times10^{-8}$ rad (or $\Delta Z=5.7\times10^{-7}$) which corresponds to $1.2\times10^{-4}$ A° of length shift.

Since $\Omega_{RES}=\Delta Z\lambda c/2RL$, the minimum resolvable rotation rate=7 nrad/sec or 0.00145°/hr, which is the theoretical lower limit set by quantum noise, for an integration time of one second. For longer integration times, the resolvable rotation rate improves, it being proportional to the inverse square root of the integration time.

The operation of present gyro 20 is most easily understood when the electronic feedback components are described as analog elements such as synchronous demodulator, integrator and voltage controlled oscillator. In a practical embodiment for high performance implementation, digital processing also can be used. The majority of the analog elements heretofore described can be replaced, almost one-for-one, with their equivalent digital counterparts such as a 10-bit A/D converter with sequential two-word subtractor, binary counter, and digital frequency synthesizer respectively. The advantages of a digital scheme are many. For example, such components have a very wide dynamic range due to the counting nature of the operation. They have low noise susceptibility and frequency is substituted for voltage allowing individual component accuracies as high as one part in $10^7$ to $10^8$ vs one part in $10^4$ to $10^5$. In a complete inertial navigation system containing 2 to 6 gyros, a single accurate clock can be used to drive all gyro electronics, reducing cost substantially. Also, simple compatibility with microprocessors and other elements now being used in gyro systems allows a relatively economic interface therewith.

The phase nulling detection method used in the present gyro 20 relaxes the requirements for the necessary analog components that are employed. Since the operating principle is one of nulling out the rotation rate, the only signals detected at constant rotation rate are residual phase noises and errors in the gyro 20. The only time substantial signals are detected is during rotation rate changes, whereupon the feedback loop drives the acousto-optic modulator frequency to compensate for such changes, after which the signal again returns to a null. Normally this operation entails an analog error signal dynamic range of less than 1000:1. Consequently, the acousto-optic preamp, gain control amp, and A/D converter all fall within reasonable range of performance and cost. Most of the digital components can be standard TTL or CMOS integrated circuits, or may be combined into a single microprocessor chip.

The difficult element remaining is the frequency synthesizer. There are several approaches possible but all synthesizers must be capable of frequency synthesis resolution of about 1 part in $10^5$ and although small phase fluctuations are of little importance, the total phase accumulation over periods of seconds must be accurate to avoid random walk in rotation angle. Phase is proportional to rotation angle, whereas frequency is proportional to rotation rate. Consequently, either a direct digital frequency synthesizer or a digitally controlled phase locked loop synthesizer with a crystal clock is desirable. Small amplitude fluctuations are also of little importance as long as they are not directly at the dither frequency. In any case, amplitude fluctuations can be removed by clipping and bandpass filtering just prior to the acousto-optic modulator, which is required to operate over a relatively narrow bandwidth of less than 2 MHz at about 50 MHz.

One approach to a digital feedback loop is shown in FIG. 15. Although several refinements are included such as biasing, digital output rate and position words, and switched dither, the circuit 124 basically is just a substitution of equivalent digital components for analog elements. By appropriately scaling the size of the rotation rate word and rotation position word, the least significant bit of the angular position can be set in the range of ½ to 1 arc second, the normally required level of quantization.

As shown, the beams 38 and 40 are reflected on the detector 50 whose output is amplified in an A/C preamp 125 where it is used in combination with a signal out of the laser monitor detector 32 to produce an analog gain control signal out of a gain control amplifier 126. This analog signal is sent to a signed 9 bit A/D converter 127 controlled by a clock input 128. The output of the A/D converter 127 is fed to a sequential two-word subtractor 129 also timed by the clock signal 128 from clock means 130 to produce an output signal which is fed to a binary adder/accumulator 131 operating at a clock speed which is divided in half by a divider 132. The output of the accumulator 131 is fed to a binary adder 134 along with a bias set signal 136 which produces a rotation rate word output on output line 138. The rotation rate word is also fed to a binary adder/accumulator 140 whose output is fed back to one of its inputs so that it operates as a rate integrator to produce a rotation position word on output line 142.

The rotation rate word is also fed to a digitally controlled frequency synthesizer 144 which is controlled by another clock signal 146 from the clock means 130 to produce an output frequency to a single sideband mixer 148. The output of the single sideband mixer 148 is controlled by another clock input 149 from the clock means 130 and is sent to a single sideband mixer 150. The clock means 130 also produces a fourth output 152 which controls a quadrature ring counter 154 to produce the dither phase deviation. One output of the quadrature ring counter 154 is passed through a low pass filter 156 and fed as an input to the single sideband mixer as the aforesaid cosine signal, whereas the other output of the quadrature ring counter is passed through another low pass filter 160 and is mixed with the clock signal 128 to a true/complement select (at the dither switching rate) 158 whose output is fed to the mixer 150 as the sine term as aforementioned. The output of the single sideband mixer 150 is a frequency which is amplified by an RF amplifier 162 and used to control the acousto-optic modulator, such as the frequency shifter 48 in FIG. 1.

The gyro 20 as shown in FIG. 1 can be put into schematic form where $\phi$ represents the relative phase difference between the counterpropagating beams on the detector 50, $V_D$ is the voltage signal put out from the detector 50, V is the voltage output from the integrator 60 and f is the frequency output of the voltage controlled oscillator. The equation for each stage of FIG. 1 may be written as:

$$\phi_R = K_0 \quad (11)$$

$$f = K_1 V \quad (12)$$

$$\phi = \phi_R - K_2 F \quad (13)$$

$$V_D = K_3 \phi \quad (14)$$

$$V = K_4 V_D \quad (15)$$

where $K_0$, $K_1$, $K_2$, $K_3$, and $K_4$ are constants of the system, $\phi_R$ is the phase difference of the counterpropagating beams due to rotation and $\dot{V}$ represents the derivative of the voltage V with respect to time. Using Equations (11) thru (15):

$$\frac{\dot{V}}{K_4 K_3} = \frac{V_D}{K_3} = \phi = -K_2 f + \phi_R = -K_2 f K_0 \Omega \quad (16)$$

and since:

$$\dot{f} = K_1 \dot{V}_1, \dot{V} = \frac{\dot{f}}{K_1} \quad (17)$$

Equation (16) becomes:

$$\frac{\dot{f}}{K_1 K_3 K_4} = K_0 \Omega - K_2 f \quad (18)$$

$$\dot{f} + K_1 K_2 K_3 K_4 f = K_0 K_1 K_3 K_4 \Omega \quad (19)$$

Letting $\overline{K}_1 = K_1 K_2 K_3 K_4$, and $\overline{K}_2 = K_0 K_1 K_3 K_4$
Equation (19) can be rewritten as:

$$\dot{f} + \overline{K}_1 f = \overline{K}_2 \Omega \quad (20)$$

thus for constant angular velocities $\Omega$, f is directly proportional to $\Omega$. Integrating Equation (20) for t=0, at which time the system is at rest and f(0)=0 renders:

$$\int_0^t \dot{f} dt + \overline{K}_1 \int_0^t f dt = \overline{K}_2 \int_0^t \Omega dt \quad (21)$$

or:

$$f(t) + \overline{K}_1 N = \overline{K}_2 \theta_R \quad (22)$$

where N equals the number of cycles of frequency f and $\theta_R$ is the angle through which the device has turned. For a constant angular velocity f(t) equals a constant. This corresponds to a turning error which can be corrected by reading out the value of f(t) and incorporating it in the processing as in Equation (22). Also, the sensitivity of the device to acceleration depends upon the response time of the circuit. As an example consider the system described in association with Equation (7) where $\Delta f=10^5 \Omega$ ($\Delta f$—hertz, $\Omega$—rad/sec). At 300°/sec this corresponds to a frequency output of 0.5 MHz or one cycle count equals about 2 arcseconds. If the response time of the circuit is one millisecond and the system 20 accelerates from 0°/sec to 300°/sec in one second 500 cycles could be "lost" corresponding to a possible error in absolute position of 1000 arcseconds. Decreasing the response time of the circuit to 0.1 msec would reduce this to 100 arcseconds.

Although the acceleration considered is rather high and the angular offset small this error can easily be eliminated by introducing f(t) and or f(t) into the processing. This can be done by using an A/D converter to digitize the voltage V, thus obtaining a value for f(t) from Equation (5) which may be used in Equation (22) to obtain a corrected output. Since the correction in Equation (22) will be small for a reasonably fast system the requirements on the A/D converter will be low. An alternative method would use digital techniques to read out f(t) by taking successive values of f(t) and dividing by the sampling interval.

The techniques described above externally correct the output of the first order closed loop response of the device. It also is possible to build a second or higher order closed loop device, as is well known in servomechanism theory, in order to provide an internally corrected device exhibiting no position offset at constant acceleration for a second order loop, constant rate of acceleration for a third order loop and so forth.

Figure 17:
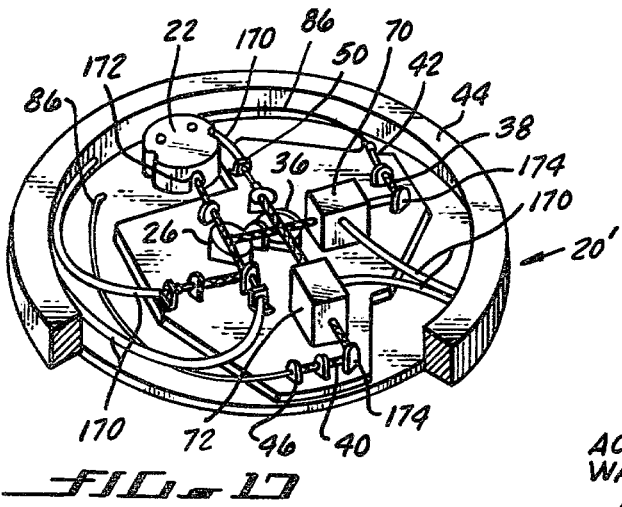
FIG. 17 is a perspective view of the device of FIG. 16.

FIGS. 16 and 17 show an actual embodiment of the present invention configured as a one inch thick disc which is 5 inches in diameter. Components for this configuration are commercially available and those previously discussed have been given the same number as used heretofor. Additionally, suitable cables 170 are provided for connection to the exterior electronics and suitable lenses 172 and mirrors 174 are shown positioned to control and focus the beams in their proper positions.

Figure 18:
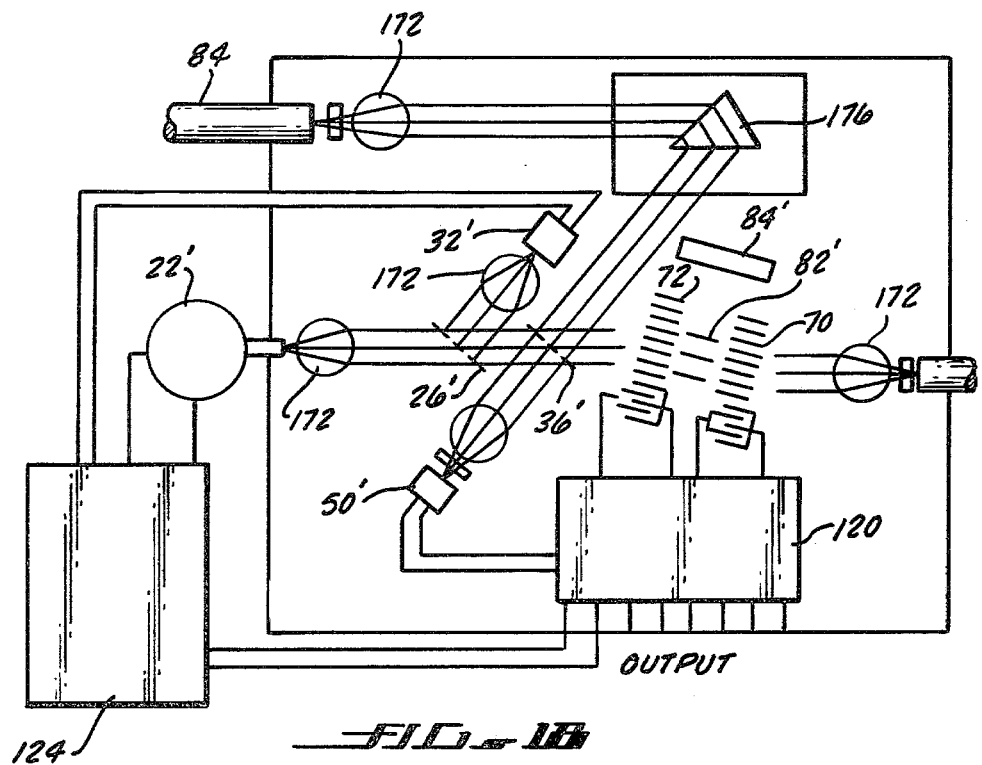
FIG. 18 is a top view of the gyro system with most portions thereof constructed on a single integrated circuit chip.

It is also possible to reduce the size of the components shown in FIGS. 16 and 17 and the electronics by constructing most of the components on a single integrated circuit chip as shown in FIG. 18 wherein an additional component like a bending guide 176 may be employed instead of a mirror 174. With such an integrated optical approach the laser gyro could be as small as 2" diameter by 0.1" thick with presently available optical fibers. Since the disc forms the outer diameter of the gyro, any further reduction would be limited by the smallest possible fiber optic bending radius and the bending losses incurred.

Figure 19:
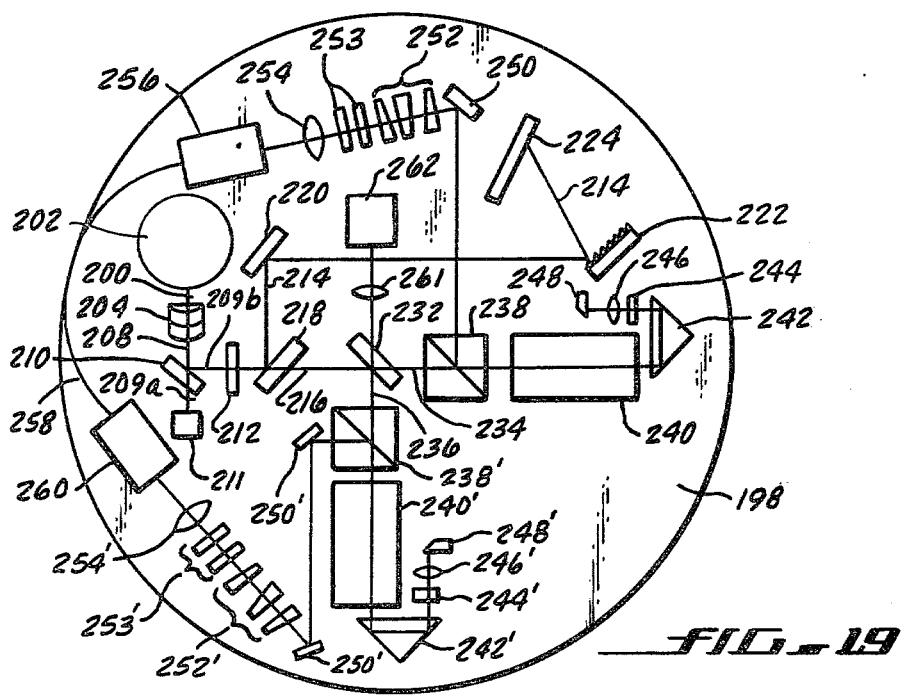
FIG. 19 is an embodiment of the present laser gyro incorporating the non-deflection system shown in FIG. 14B.
Figure 20:
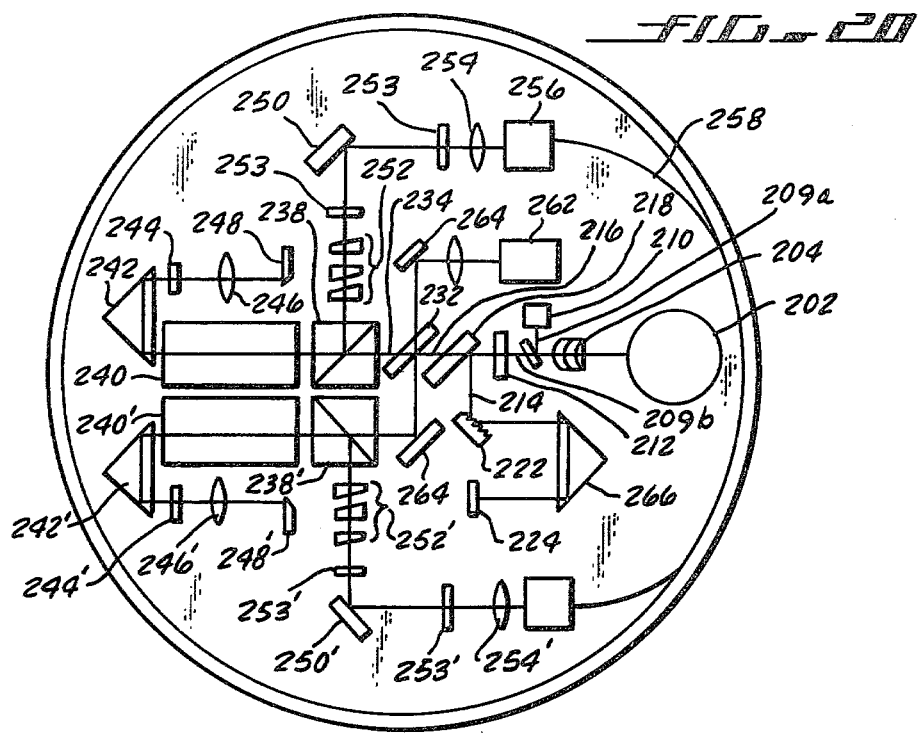
FIG. 20 shows another embodiment similar to that shown in FIG. 19.

Other physical arrangements for the gyro 20 are shown in FIGS. 19 and 20. In FIG. 19, a gyro 198 is shown where light 200 from a light source such as a single frequency laser diode 202 passes through a set of collimating optics 204. The collimated beam 208 is split into beams 209a and 209b by the beamsplitter 210. The beam 209a falls onto a detector 211 which is used to control the output of the laser diode 202. The beam 209b passes through a neutral density filter 212 which suppresses feedback into the diode 202. The beam 209b thereafter is split into two beams 214 and 216 by a beamsplitter 218. Beam 214 reflects off a mirror 220 and onto a diffraction grating 222 where it reflects off at an angle which depends on the output frequency of the diode 202. Consequently, the position at which the beam 214 falls on a proportional photodiode 224 is dependent upon this output frequency. Thus, the output voltage from the proportional photodiode 224 can be used to determine the effective frequency (and therefore wavelength) of the beam 200 from the diode 202, allowing determination of the scale factor between the voltage controlled oscillator output frequency shift and the rotation rate.

The beam 216 is split by a beamsplitter 232 into two counterpropagating beams 234 and 236. Beam 234 passes through a polarizing beamsplitter cube 238 and into the reflection suppression system described in association with FIG. 14B which includes an acousto-optic modulator 240, a prism retro-reflector 242, a quarter wave plate 224, a lens 246 and a mirror 248. These last mentioned components shift the frequency of the beam 234 and rotate the polarization thereof 90° so that upon reflection to the beamsplitter cube 238, the beam 234 is directed to a mirror 250 and through a series of optical wedges (Risley Prisms) 252 and quarter and half wave plates 253 which correct depolarization of the fiber. The beam 234 is then directed into a lens 254 which focuses the beam 234 into the fiber end 256 of the fiber coil 258. Like components numbered the same with a prime (') added thereto are placed at the other end 260 of the coil 258 to produce the counterpropagating beam in the like manner. The two counterpropagating beams re-immerge from the beamsplitter 232, and are focused by the lens 261 to mix at the detector 262. FIG. 20 shows a similar but more compact arrangement with mirrors 264 and a retro-reflector prism 266 added to transport the beams to the proper locations.

It is possible to use the techniques employed for implementation of the phase nulling laser gyro in combination with novel modulation techniques to produce modest performance, very low cost gyros.

Figure 21:
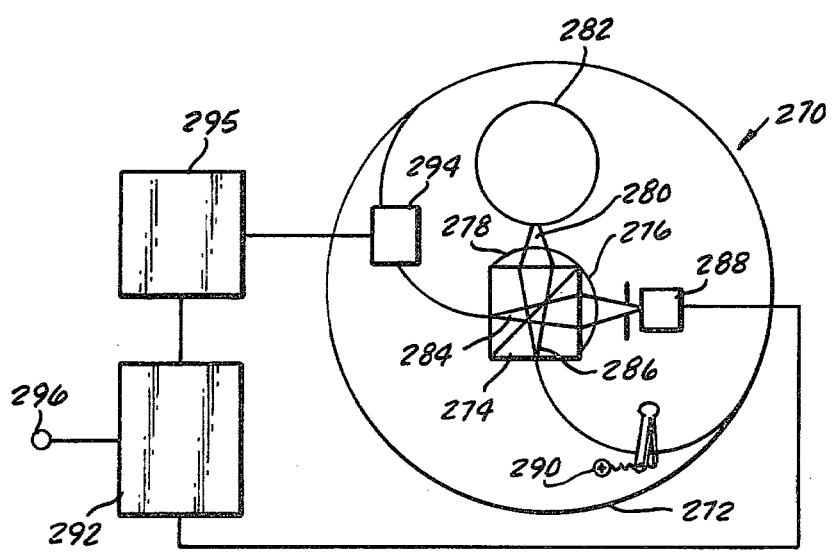
FIG. 21 shows schematically a very low cost embodiment of the present invention based on pressure effects of the optical fiber.

FIG. 21 illustrates the layout of a low cost fiber optic layer gyro 270 based on nonreciprocal phase shifts induced by pressure applied to the optical fiber 272, (that such methods can be used has been experimentally observed). A beamsplitter cube 274 with lenses 276 and 278 which could be molded out of plastic serves to split the input beam 280 from the laser diode or light emitting diode (LED) 282 into counterpropagating beams 284 and 286. These beams 284 and 286 pass through the optical fiber 272 and mix on a detector 288. Nonreciprocal residual phase shifts due to the optical elements are adjusted by applying pressure to the optical fiber 272 via an adjustable screw clamp 290 or other pressure generating device such as a piezoelectric device, so that the beams interfere constructively at the detector 288 so as to maximize signal and reduce feedback to the light source 282. The gyro 270 is then operated in the open loop fashion of the phase nulled laser gyro as in FIGS. 2 and 3. A synchronous demodulator 292 picks up the first harmonic of the dither rate determined by the piezoelectric device 294 and driver 295 which has an amplitude and phase proportional to rotation rate as in FIG. 2B and produces the output at 296.

A second approach 300 is shown in FIG. 22. Linearly polarized light 302 from a light source 304 is split by the beamsplitter 306 into counterpropagating beams 308 and 310. Two quarter wave plates 312 and 314 are aligned with their optic axis at 45° to the polarization of beams 308 and 310. In this manner right hand circularly polarized light is introduced into each end of the optical fiber 316 and counterpropagating beams are established therein. Nonreciprocal phase differences between the beams 308 and 310 can be introduced by passing current through a toroidal coil 318 introducing a magnetic field in the optical fiber 316 advancing the phase of the light propagating in the direction of the magnetic field and retarding the phase of the light beam propagating against it. By controlling the amplitude and direction of the current in the coil 318, a phase dither can be established. The gyro 300 is operated in an open loop fashion. The phase and amplitude of the signal at the dither frequency received by a detector 320 proportional to the direction and amplitude of rotation is processed by a demodulator 322 and is fed to output 324. Another output 326 is also produced to control the circuitry 328 to produce the current fluctuations for the coil 318.

Note that the embodiments of FIGS. 21 and 22 can be operated in closed loop fashion similar to the gyro 20; however, the analog nature of the output thereof would restrict the useful dynamic range of these devices to relatively modest levels. Their main advantage lies in their simplicity. An additional simplification of the embodiments in FIGS. 21 and 22 involves the replacement of the beamsplitters 274 and 306 with two partially fused appropriately tapered fiber portions 330 and 332 of the fibers 272 or 316 for efficient evanescent light coupling. FIG. 23A shows the relative positions of the fiber portions 330 and 332, light source 282 or 304 (LED, laser diode) and detector 288 or 320.

Thus there has been shown and described novel phase nulling gyros which fulfill all the objects and advantages sought therefor. Many changes, modifications, variations, uses and applications of the subject invention however will become apparent to those skilled in the art after considering this specification and the accompanying drawings. All such changes, modifications, alterations and other uses and applications which do not depart from the spirit and scope of the invention are deemed to be covered by the invention which is limited only by the claims which follow:

What is claimed is:

1. An optical device for determining rotation including:
    a light source which produces a first beam of light;
    means for splitting said first beam of light into at least second and third beams of light and recombining said second and third beams into a fourth beam of light;
    means for directing said second and third beams of light in opposite directions along a path about a predetermined axis about which the rotation is to be measured to establish a counterpropagating light path for said second and third beams;
    means capable of varying nonreciprocal phase shift between said second and third beams of light positioned in said second and third beams of light;
    means for detecting said fourth beam of light and producing therefrom an output indicative of phase shift induced by the rotation about said predetermined axis; and
    means for compensating said output of said means for detecting to restore said output of said means for detecting to the phase relationship without rotation by producing an output indicative of the degree of phase compensation and applying said output indicative of the degree of phase compensation to said means capable of varying nonreciprocal phase shift, said output indicative of the degree of phase compensation also indicating rotation.

2. The device as defined in claim 1 wherein said means establishing a counterpropagating light path include:
    an optical fiber wound in a coil about said predetermined axis about which the rotation is to be measured, said optical fiber having first and second ends; and
    means for applying said second and third beams of light to said first and second fiber ends respectively.

3. The device as defined in claim 2 wherein said means capable of varying nonreciprocal phase shift between said second and third beams of light include:
    at least a first light beam frequency shifter positioned in said counterpropagating light path to introduce and vary nonreciprocal phase shift in said second and third beams of light.

4. The device as defined in claim 3 wherein said means for detecting said fourth beam of light and producing therefrom an output indicative of phase shift induced by the rotation about said predetermined axis include:
    a detector positioned to intercept said fourth beam of light, said detector including means to produce an electrical detector output signal indicative of the intensity of said fourth beam of light, and wherein said means for compensating said output of said means for detecting include:
    electrical circuitry connected to receive said electrical detector output signal and to produce therefrom said output indicative of the rotation about said predetermined axis.

5. The device as defined in claim 4 wherein said output indicative of phase shift induced by rotation about said predetermined axis is an electrical signal which is fed to said first light beam frequency shifter, said electrical circuitry including:
- a synchronous demodulator which rectifies and low pass filters and electrical detector output signal and produces a demodulated signal output;
- an integrator which receives said demodulator signal output and produces therefrom a rotation rate output signal proportional to rotation rate about said predetermined axis; and
- a controllable oscillator to which is fed said rotation rate output signal which controls the frequency of the output thereof which is said output indicative of the rotation about said predetermined axis.

6. The device as defined in claim 5 wherein said synchronous demodulator includes:
- an analog to digital converter which receives said electrical detector output signal in analog form and converts it to digital form; and
- a sequential subtractor which receives said electrical detector output signal in digital form from said analog to digital converter and passes it in word form to said integrator.

7. The device as defined in claim 6 wherein said integrator includes:
- a binary adder/accumulator having a first inlet which receives said electrical detector output signal from said sequential subtractor, an output, and a second input connected to said output thereof.

8. The device as defined in claim 7 including a binary adder connected to said output of said binary adder/accumulator and producing as an output thereof a rotation rate word.

9. The device as defined in claim 8 wherein said rotation rate word is fed to a rate integrator to form a rotation position word.

10. The device as defined in claim 9 wherein said controllable oscillator includes:
- a digitally controlled frequency synthesizer to which is fed said rotation rate word and which produces therefrom an output whose frequency varies with variations in said rotation rate word;
- a clock which produces related clock pulses;
- a single sideband mixer having inputs connected to said output of said digitally controlled frequency synthesizer and said clock and an output;
- a quadrature ring counter having an input connected to said clock and first and second outputs;
- a second single sideband mixer having first, second, and third inputs and an output;
- a first low pass filter connecting said first output of said quadrature ring counter to said first input of said second single sideband mixer;
- dither means; and
- a second low pass filter connecting said second output of said quadrature ring counter to said second input of said second single sideband mixer through said dither means, whereby the output of said second single sideband mixer is fed to said frequency shifter.

11. The device as defined in claim 10 further including:
- a light source output detector which produces an electrical signal in accordance with the light impinging thereon;
- a light source monitor beam splitter positioned to intercept and split a portion of said first beam of light onto said light source output detector; and
- a gain control amplifier positioned between said detector positioned to intercept said fourth beam, and said analog to digital converter, said gain control amplifier being connected to said electrical signal output of said light source output detector and producing as an output to said analog to digital converter said electrical detector output signal of said detector positioned to intercept said fourth beam of light adjusted for variations in output of said light source.

12. The device as defined in claim 5 wherein said first light beam frequency shifter is an acousto-optic modulator.

13. The device as defined in claim 5 wherein said first light beam frequency shifter includes:
- first and second mirrors positioned to intercept and reflect said second and third beams of light;
- a retroreflector positioned to intercept and reflect said beam of light from said first mirror to said second mirror and reflect said beam of light from said second mirror to said first mirror; and
- a piezo-electric crystal upon which said retroreflector is mounted, said piezo-electric crystal being connected to said output signal indicative of the rotation about said predetermined axis to move said retroreflector in accordance therewith.

14. The device as defined in claim 13 including:
- a retroreflector operation detector for monitoring the operation of said first light beam frequency shifter; and
- a frequency shifter beam splitter positioned to intercept and split a portion of said second and third beams onto said retroreflector operation detector.

15. The device as defined in claim 4 further including:
- a light source output detector which produces an electrical signal in accordance with the light impinging thereon;
- a light source monitor beam splitter positioned to intercept and split a portion of said first beam of light onto said light source output detector; and
- a connection to feed said electrical signal from said light source output detector to said electrical circuitry where it is used to adjust said electrical detector output signal of said detector positioned to intercept said fourth beam of light for variations in output of said light source.

16. The device as defined in claim 15 further including:
- a frequency monitor beam splitter positioned to intercept and split a portion of said first beam of light into a frequency monitoring beam;
- a wide band pass, low finesse etalon positioned in said frequency monitoring beam; and
- a frequency monitor beam detector positioned to detect said frequency monitoring beam after it has passed through said wide band pass, low finesse etalon to produce an electrical output which varies with the frequency of said first beam whereby the frequency of said light source can be monitored.

17. The device as defined in claim 16 including:
- a second frequency monitor beam splitter positioned to intercept and split a portion of said first beam of light into a second frequency monitoring beam;

a long path length, narrow passband etalon positioned in said second frequency monitoring beam; and a second frequency monitor beam detector positioned to detect said second frequency monitoring beam after it has passed through said long path length narrow passband etalon to produce an electrical output which varies abruptly with the frequency of said first beam whereby the frequency of said light source can be accurately monitored.

18. The device as defined in claim 17 wherein said long path length, narrow passband etalon positioned in said second frequency monitoring beam is an optical fiber with partially reflective end surface faces.

19. The device as defined in claim 15 further including:

a frequency monitor beam splitter positioned to intercept and split a portion of said first beam of light into a frequency monitoring beam;

an interference filter positioned in said frequency monitoring beam; and a frequency monitor beam detector positioned to detect said frequency monitoring beam after it has passed through said interference filter, said frequency monitor beam detector producing an electrical output which varies with the frequency of said first beam whereby the frequency of said light source can be monitored.

20. The device as defined in claim 19 including:

a second frequency monitor beam splitter positioned to intercept and split a portion of said first beam of light into a second frequency monitoring beam;

a long path length, narrow passband etalon positioned in said second frequency monitoring beam; and a second frequency monitor beam detector positioned to detect said second frequency monitoring beam after it has passed through said long path length narrow passband etalon to produce an electrical output which varies abruptly with the frequency of said first beam whereby the frequency of said light source can be accurately monitored.

21. The device as defined in claim 20 wherein said long path length, narrow passband etalon is an optical fiber with partially reflective end surface faces.

22. The device as defined in claim 15 further including:

a frequency monitor beam splitter positioned to intercept and split a portion of said first beam of light into a frequency monitoring beam;

an optical grating positioned to reflect said frequency monitoring beam at an angle which is dependent upon the frequency of said first beam of light; and a frequency monitor, beam position sensitive, detector positioned to detect the position of said frequency monitoring beam after it has been reflected by said optical grating, said frequency monitor, beam position sensitive detector producing an electrical output which varies with the frequency of said first beam whereby the frequency of said light source can be monitored.

23. The device as defined in claim 2 wherein said light source includes spacial filter means through which said first beam of light passes as said first beam of light passes toward said means for splitting said first beam of light into at least second and third beams of light and recombining said second and third beams into a fourth beam of light, said device further including:

first and second lenses adjacent said first and second ends of said fiber to direct said second and third beams of light onto said fiber ends, said first and second lenses being positioned to refocus said second and third beams of light onto said fiber ends, whereby any of said beams directed back toward said light source are at least partially blocked by said spatial filter means.

24. The device as defined in claim 2 further including:

a toroidal winding positioned about said coil of optical fiber;

means to cause suitable current to flow in said toroidal winding to cause about a 45° one way polarization rotation to occur within said coil of optical fiber;

a polarizing beam splitter positioned in the pathway of said first beam of light, said polarizing beam splitter being positioned so that any light traveling toward said light source is reflected by said polarizing beam splitter away from said light source.

25. The device defined in claim 24 further including an absorber, said absorber being positioned so that any light traveling toward said light source and reflected by said polarizer beam splitter away from said light source is reflected onto said absorber.

26. The device as defined in claim 2 wherein said coil of optical fiber is cylindrical and has an about equal number of windings spiraling in one direction along said predetermined axis as in the opposite direction along said predetermined axis, said windings spiraling with the same rotation direction about said predetermined axis.

27. The device as defined in claim 2 wherein said coil of optical fiber includes magnetic shielding thereabout whereby said magnetic shielding prevents possible extraneous nonreciprocal phase shifts being induced by stray magnetic fields.

28. The device as defined in claim 1 wherein said means capable of varying nonreciprocal phase shift between said second and third beams of light include means to introduce a phase dither in said second and third beams of light.

29. The device as defined in claim 28 wherein said means to introduce a phase dither in said second and third beams of light introduces a sine wave phase dither.

30. The device as defined in claim 28 wherein said means to introduce a phase dither in said second and third beams of light introduces a switching phase dither.

31. The device as defined in claim 28 wherein said means establishing a counterpropagating light path for said second and third beams of light about a predetermined axis about which the rotation is to be measured include an optical fiber, and wherein said means capable of varying nonreciprocal phase shift include piezoelectric means connected to apply force to said optical fiber.

32. The device as defined in claim 28 wherein said means to introduce a phase dither in said second and third beams of light include an optical fiber through which said second and third beams of light pass and means to apply force to said optical fiber.

33. The device as defined in claim 32 wherein said means to apply force to said optical fiber include piezoelectric means connected to said fiber.

34. The device as defined in claim 33 wherein said optical fiber has a side surface connected to said piezoelectric means.

35. The device as defined in claim 2 wherein at least one of said ends of said optical fiber include:
a ferrule to which said optical fiber end is attached, said ferrule having an end surface thereon at a non-right angle to said optical fiber therein.

36. The device as defined in claim 35 wherein said ferrule includes:
a cavity of index matching fluid about said end of said optical fiber; and
an optical window forming said ferrule end surface and closing said cavity.

37. The device as defined in claim 35 wherein said ferrule end surface is an optical window to which said end of said optical fiber is cemented.

38. The device as defined in claim 35 wherein said at least one of said ends of said optical fiber forms a portion of said ferrule end surface.

39. The device defined in claim 2 wherein said means capable of varying nonreciprocal phase shift include piezoelectric means connected to apply force to said optical fiber.

40. The device as defined in claim 3 wherein said second beam of light has a polarization in a first predetermined direction, said device further including:
a polarizing beam splitter positioned and oriented in said second beam of light so that said second beam of light can pass out thereof in a first predetermined direction, said light beam frequency shifter being positioned in said second beam of light after said second beam of light has passed out of said polarizing beam splitter in said first predetermined direction, said second beam passed out of said polarizing beam splitter having zero-order and first-order portions, the zero-order and first-order portions of said second beam of light thereafter going in different directions;
a quarter-wave plate positioned in said second beam of light after said second beam of light has passed through said light beam frequency shifter and oriented 45° from said first predetermined direction of polarization to convert the polarization of said second beam of light to circular polarization;
means to change the wavefront radius of curvature of said second beam of light once it has passed through said quarter-wave plate; and
means to reflect said first-order portion of said second beam of light back through said quarter-wave plate, said frequency shifter, and said polarizing beam splitter whereby the effect of beam deflection of said frequency shifter is suppressed.

41. The device as defined in claim 40 wherein said means to change the wavefront radius of curvature of said second beam of light once it has passed through said first quarter-wave plate include a positive lens; and wherein said means to reflect said first-order portion of said second beam of light back through said first quarter-wave plate, said first frequency shifter, and said first polarizing beam splitter include a plane mirror having a well defined edge positioned so that said well defined edge is positioned between said zero-order and first-order portions of said second beam of light.

42. The device as defined in claim 40 wherein said means to change the wavefront radius of curvature of said second beam of light once it has passed through said first quarter-wave plate include a positive lens; and wherein said means to reflect said first-order portion of said second beam of light back through said first quarter-wave plate, said first frequency shifter, and said first polarizing beam splitter include a mirror positioned to reflect said first-order portion of said second beam of light, said mirror having a stop positioned in the path of said zero-order portion of said second beam of light.

43. The device as defined in claim 3 wherein said first light beam frequency shifter includes an optical fiber positioned in said counterpropagating light path and a piezoelectric element connected to apply force thereto to induce nonreciprocal phase shift in light in said counterpropagating light paths.

44. The device as defined in claim 1 wherein said light source is a laser.

45. The device as defined in claim 1 wherein said light source is a laser diode.

46. The device as defined in claim 1 wherein said light source is a light emitting diode (LED).

47. The device as defined in claim 1 wherein said means for splitting said first beam of light into at least second and third beams of light and recombining said second and third beams into a fourth beam of light include two optical fibers partially fused together to form an evanescent light coupling.

48. An optical device for determining rotation including:
a light source which produces a first beam of light;
means for splitting said first beam of light into at least second and third beams of light and recombining said second and third beams into a fourth beam of light;
means for directing said second and third beams of light in opposite directions along a path about a predetermined axis about which the rotation is to be measured to establish a counterpropagating light path for said second and third beams, including:
an optical fiber wound in a coil about said predetermined axis about which the rotation is to be measured, said optical fiber having first and second ends; and means for applying said second and third beams of light to said first and second fiber ends respectively;
means capable of varying nonreciprocal phase shift between said second and third beams of light positioned in said second and third beams of light including:
at least a first light beam frequency shifter positioned in said counterpropagating light path to introduce and vary nonreciprocal phase shift in said second and third beams of light; and
a second frequency shifter, said first frequency shifter being positioned between said means for splitting and recombining and said first fiber end, and said second frequency shifter being positioned between said means for splitting and recombining and said second fiber end; and
means for detecting said fourth beam of light and producing therefrom an output indicative of the rotation about said predetermined axis.

49. The device as defined in claim 48 wherein said second and third beams of light have polarization in predetermined directions, said device further including:
a first polarizing beam splitter positioned and oriented in said second beam of light so that said second beam of light can pass out thereof in a first predetermined direction, said first light beam frequency shifter being positioned in said second beam of light after said second beam of light has passed out of said first polarizing beam splitter in said first predetermined direction, said second beam passed out of said polarizing beam splitter having zero-order and first-order portions, the zero-order and first-order portions of said second beam of light thereafter going in different directions;

a first quarter-wave plate positioned in said second beam of light after said second beam of light has passed through said first light beam frequency shifter and oriented 45° from said first predetermined direction of polarization to convert the polarization of said second beam of light to circular polarization;

first means to change the wavefront radius of curvature of said second beam of light once it has passed through said first quarter-wave plate;

first means to reflect said first-order portion of said second beam of light back through said first quarter-wave plate, said first frequency shifter, and said first polarizing beam splitter;

a second polarizing beam splitter positioned and oriented in said third beam of light so that said third beam of light can pass out thereof in a first predetermined direction, said second light beam frequency shifter being positioned in said third beam of light after said third beam of light has passed out of said second polarizing beam splitter in said first predetermined direction, the zero-order and first-order portions of said third beam of light thereafter going in different directions;

a second quarter-wave plate positioned in said third beam of light after said third beam of light has passed through said second light beam frequency shifter and oriented 45° from said first predetermined direction of polarization to convert the polarization of said third beam of light to circular polarization;

second means to change the wavefront radius of curvature of said third beam of light once it has passed through said second quarter-wave plate; and second means to reflect said first-order portion of said third beam of light back through said second quarter-wave plate, said second frequency shifter, and said second polarizing beam splitter, whereby the effects of beam deflection of said frequency shifters are suppressed.

50. The device as defined in claim 49 wherein said first and second means to change the wavefront radius of curvature of said second and third beams of light once they have passed through said first and second quarter-wave plates each include a lens; and wherein said first means to reflect said first-order portion of said second and third beams of light back through said first and second quarter-wave plates, said first and second frequency shifters, and said first and second polarizing beam splitters each include a plane mirror having a well defined edge positioned so that said well defined edge is positioned between said zero-order and first-order portions of said beam of light.

51. The device as defined in claim 49 wherein said first and second means to change the wavefront radius of curvature of said second and third beams of light once they have passed through said first and second quarter-wave plates each include a lens; and wherein said first means to reflect said first-order portion of said second and third beams of light back through said first and second quarter-wave plates, said first and second frequency shifters, and said first and second polarizing beam splitters each include a mirror positioned to reflect said first-order portion of said beam of light, said mirror having a stop positioned in the path of said zero-order portion of said beam of light.

52. The device as defined in claim 48 wherein said first and second frequency shifters are operated at a common center frequency $f_c$ and a fixed frequency bias $f_b$ of a magnitude sufficient to induce a phase change of $\pi$ between said second and third beams of light whereby a dark fringe is directed back to said light source and a light fringe is directed to said means for detecting said fourth beam of light and producing therefrom an output indicative of the rotation about said predetermined axis.

53. The device as defined in claim 52 wherein said first and second frequency shifters are positioned symmetrically with respect to said first and second fiber coil ends whereby any light which is fed back to said light source will have been shifted by $2f_c$ to strongly reduce feedback noise.

54. An optical device for determining rotation including:

a light source which produces a first beam of light;

means for splitting said first beam of light into at least second and third beams of light and recombining said second and third beams into a fourth beam of light;

means for directing said second and third beams of light in opposite directions along a path about a predetermined axis about which the rotation is to be measured to establish a counterpropagating light path for said second and third beams, including:

an optical fiber wound in a coil about said predetermined axis about which the rotation is to be measured, said optical fiber having first and second ends; and means for applying said second and third beams of light to said first and second fiber ends respectively;

means capable of varying nonreciprocal phase shift between said second and third beams of light positioned in said second and third beams of light including at least a first light beam frequency shifter positioned in said counterpropagating light path to introduce and vary nonreciprocal phase shift in said second and third beams of light; and means for detecting said fourth beam of light and producing therefrom an output indicative of the rotation about said predetermined axis including:

a detector positioned to intercept said fourth beam of light, said detector including means to produce an electrical detector output signal indicative of the intensity of said fourth beam of light; and electrical circuitry connected to receive said electrical detector output signal and to produce therefrom said output indicative of the rotation about said predetermined axis, wherein said output indicative of the rotation about said predetermined axis is an electrical signal which is fed to said first light beam frequency shifter, said electrical circuitry including:

a synchronous demodulator which rectifies and low pass filters said electrical detector output signal and produces a demodulator signal output;

an integrator which receives said demodulator signal output and produces therefrom a rotation rate output signal proportional to rotation rate about said predetermined axis; and a controllable oscillator to which is fed said rotation rate output signal which controls the frequency of the output thereof which is said output indicative of the rotation about said predetermined axis.

55. The device as defined in claim 54 wherein said first frequency shifter is an acousto-optic modulator.

56. The device as defined in claim 54 wherein said first frequency shifter includes:
first and second mirrors positioned to intercept and reflect said beams of light;
a retroreflector positioned to intercept and reflect said beam of light from said first mirror to said second mirror and reflect said beam of light from said second mirror to said first mirror; and
a piezo-electric crystal upon which said retroreflector is mounted, said piezo-electric crystal being connected to said output signal indicative of the rotation about said predetermined axis to move said retroreflector in accordance therewith.

57. The device as defined in claim 54 wherein said synchronous demodulator includes:
an analog to digital converter which receives said electrical detector output signal in analog form and converts it to digital form; and
a sequential subtractor which receives said electrical detector output signal in digital form from said analog to digital converter and passes it in word form to said integrator.

58. An optical device for determining rotation including:
a light source which produces a first beam of light;
means for splitting said first beam of light into at least second and third beams of light and recombining said second and third beams into a fourth beam of light;
means for directing said second and third beams of light in opposite directions along a path about a predetermined axis about which the rotation is to be measured to establish a counterpropagating light path for said second and third beams including a optical fiber wound in a coil about said predetermined axis about which the rotation is to be measured, said optical fiber having first and second ends, at least one of said ends of said optical fiber including a ferrule to which said optical fiber end is attached, said ferrule having an end surface thereon at a non-right angle to said optical fiber therein, and means for applying said second and third beams of light to said first and second fiber ends respectively;
means capable of varying nonreciprocal phase shift between said second and third beams of light positioned in said second and third beams of light; and
means for detecting said fourth beam of light and producing therefrom an output indicative of the rotation about said predetermined axis.

59. The device as defined in claim 58 wherein said ferrule includes:
a cavity of index matching fluid about said end of said optical fiber; and
an optical window forming said ferrule end surface and closing said cavity.

60. The device as defined in claim 58 wherein said ferrule end surface is an optical window to which said end of said optical fiber is cemented.

61. The device as defined in claim 58 wherein said at least one end of said optical fiber forms a portion of said ferrule and surface.

62. An optical device for determining rotation including:
a light source which produces a first beam of light;
means for splitting said first beam of light into at least second and third beams of light and recombining said second and third beams into a fourth beam of light;
means for directing said second and third beams of light in opposite directions along a path about a predetermined axis about which the rotation is to be measured to establish a counterpropagating light path for said second and third beams, including:
an optical fiber wound in a coil about said predetermined axis about which the rotation is to be measured, said optical fiber having first and second ends; and
means for applying said second and third beams of light to said first and second fiber ends respectively;
means capable of varying nonreciprocal phase shift between said second and third beams of light positioned in said second and third beams of light including at least a first light beam frequency shifter positioned in said counterpropagating light path to introduce and vary nonreciprocal phase shift in said second and third beams of light;
means for detecting said fourth beam of light and producing therefrom an output indicative of the rotation about said predetermined axis including:
a detector positioned to intercept said fourth beam of light, said detector including means to produce an electrical detector output signal indicative of the intensity of said fourth beam of light; and
electrical circuitry connected to receive said electrical detector output signal and to produce therefrom said output indicative of the rotation about said predetermined axis;
a light source output detector which produces an electrical signal in accordance with the light impinging thereon;
a light source monitor beam splitter positioned to intercept and split a portion of said first beam of light onto said light source output detector;
a connection to feed said electrical signal from said light source output detector to said electrical circuitry where it is used to adjust said electrical detector output signal of said detector positioned to intercept said fourth beams of light for variations in output of said light source;
a frequency monitor beam splitter positioned to intercept and split a portion of said first beam of light into a frequency monitoring beam;
a wide band pass, low finesse etalon positioned in said frequency monitoring beam; and
a frequency monitor beam detector positioned to detect said frequency monitoring beam after it has passed through said wide band pass, low finesse etalon to produce an electrical output which varies with the frequency of said first beam whereby the frequency of said light source can be monitored.

63. The device as defined in claim 62 including:
a second frequency monitor beam splitter positioned to intercept and split a portion of said first beam of light into a second frequency monitoring beam;
a long path length narrow passband etalon positioned in said second frequency monitoring beam; and
a second frequency monitor beam detector positioned to detect said second frequency monitoring beam after it has passed through said long path length narrow passband etalon to produce an electrical output which varies abruptly with the frequency of said first beam whereby the frequency of said light source can be accurately monitored.

64. An optical device for determining rotation including:
a light source which produces a first beam of light;
means for splitting said first beam of light into at least second and third beams of light and recombining said second and third beams into a fourth beam of light;
means for directing said second and third beams of light in opposite directions along a path about a predetermined axis about which the rotation is to be measured to establish a counterpropagating light path for said second and third beams, including:
an optical fiber wound in a coil about said predetermined axis about which the rotation is to be measured, said optical fiber having first and second ends; and
means for applying said second and third beams of light to said first and second fiber ends respectively;
means capable of varying nonreciprocal phase shift between said second and third beams of light positioned in said second and third beams of light including at least a first light beam frequency shifter positioned in said counterpropagating light path to introduce and vary nonreciprocal phase shift in said second and third beams of light;
means for detecting said fourth beam of light and producing therefrom an output indicative of the rotation about said predetermined axis including:
a detector positioned to intercept said fourth beam of light, said detector including means to produce an electrical detector output signal indicative of the intensity of said fourth beam of light; and
electrical circuitry connected to receive said electrical detector output signal and to produce therefrom said output indicative of the rotation about said predetermined axis;
a light source output detector which produces an electrical signal in accordance with the light impinging thereon;
a light source monitor beam splitter positioned to intercept and split a portion of said first beam of light onto said light source output detector;
a connection to feed said electrical signal from said light source output detector to said electrical circuitry where it is used to adjust said electrical detector output signal of said detector positioned to intercept said fourth beam of light for variations in output of said light source;
a frequency monitor beam splitter positioned to intercept and split a portion of said first beam of light into a frequency monitoring beam;
an interference filter positioned in said frequency monitoring beam; and
a frequency monitor beam detector positioned to detect said frequency monitoring beam after it has past through said interference filter, said frequency monitor beam detector producing an electrical output which varies with the frequency of said first beam whereby the frequency of said light source can be monitored.

65. The device as defined in claim 64 including:
a second frequency monitor beam splitter positioned to intercept and split a portion of said first beam of light into a second frequency monitoring beam;
a long path length narrow passband etalon positioned in said second frequency monitoring beam; and
a second frequency monitor beam detector positioned to detect said second frequency monitoring beam after it has passed through said long path length narrow passband etalon to produce an electrical output which varies abruptly with the frequency of said first beam whereby the frequency of said light source can be accurately monitored.

66. An optical device for determining rotation including:
a light source which produces a first beam of light;
means for splitting said first beam of light into at least second and third beams of light and recombining said second and third beams into a fourth beam of light;
means for directing said second and third beams of light in opposite directions along a path about a predetermined axis about which the rotation is to be measured to establish a counterpropagating light path for said second and third beams, including:
an optical fiber wound in a coil about said predetermined axis about which the rotation is to be measured, said optical fiber having first and second ends; and
means for applying said second and third beams of light to said first and second fiber ends respectively;
means capable of varying nonreciprocal phase shift between said second and third beams of light positioned in said second and third beams of light including at least a first light beam frequency shifter positioned in said counterpropagating light path to introduce and vary nonreciprocal phase shift in said second and third beams of light;
means for detecting said fourth beam of light and producing therefrom an output indicative of the rotation about said predetermined axis including:
a detector positioned to intercept said fourth beam of light, said detector including means to produce an electrical detector output signal indicative of the intensity of said forth beam of light; and
electrical circuitry connected to receive said electrical detector output signal and to produce therefrom said output indicative of the rotation about said predetermined axis;
a light source output detector which produces an electrical signal in accordance with the light impinging thereon;
a light source monitor beam splitter positioned to intercept and split a portion of said first beam of light onto said light source output detector;

a connection to feed said electrical signal from said light source output detector to said electrical circuitry where it is used to adjust said electrical detector output signal of said detector positioned to intercept said fourth beam of light for variations in output of said light source;

a frequency monitor beam splitter positioned to intercept and split a portion of said first beam of light into a frequency monitoring beam;

an optical grating positioned to reflect said frequency monitoring beam at an angle which is dependent upon the frequency of said first beam of light; and a frequency monitor, beam position sensitive, detector positioned to detect the position of said frequency monitoring beam after it has been reflected by said optical grating, said frequency monitor beam position sensitive detector producing an electrical output which varies with the frequency of said first beam wherey the frequency of said light source can be monitored.

67. An optical device for determining rotation including:

a light source which produces a first beam of light;

means for splitting said first beam of light into at least second and third beams of light and recombining said second and third beams into a fourth beam of light said second beam of light having a polarization in a first predetermined direction;

means for directing said second and third beams of light in opposite directions along a path about a predetermined axis about which the rotation is to be measured to establish a counterpropagating light path for said second and third beams, including:

an optical fiber wound in a coil about said predetermined axis about which the rotation is to be measured, said optical fiber having first and second ends; and means for applying said second and third beams of light to said first and second fiber ends respectively;

means capable of varying nonreciprocal phase shift between said second and third beams of light positioned in said second and third beams of light including at least a first light beam frequency shifter positioned in said counterpropagating light path to introduce and vary nonreciprocal phase shift in said second and third beams of light;

means for detecting said fourth beam of light and producing therefrom an output indicative of the rotation about said predetermined axis;

a polarizing beam splitter positioned and oriented in said second beam of light so that said second beam of light can pass out thereof in a first predetermined direction, said light beam frequency shifter being positioned in said second beam of light after said second beam of light has passed out of said polarizing beam splitter in said first predetermined direction, said second beam passed out of said polarizing beam splitter having zero-order and first-order portions, the zero-order and first-order portions of said second beam of light thereafter going in different directions;

a quarter-wave plate positioned in said second beam of light after said second beam of light has passed through said light beam frequency shifter and oriented 45° from said first predetermined direction of polarization to convert the polarization of said second beam of light to circular polarization;

means to change the wavefront radius of curvature of said second beam of light once it has passed through said quarter-wave plate; and means to reflect said first-order portion of said second beam of light back through said quarter-wave plate, said frequency shifter, and said polarizing beam splitter whereby the effect of beam deflection of said frequency shifter is suppressed.

68. The device as defined in claim 67 wherein said means to change the wavefront radius of curvature of said second beam of light once it has passed through said first quarter-wave plate include a positive lens; and wherein said means to reflect said first-order portion of said second beam of light back through said first quarter-wave plate, said first frequency shifter, and said first polarizing beam splitter include a plane mirror having a well defined edge positioned so that said well defined edge is positioned between said zero-order and first-order portions of said second beam of light.

69. The device as defined in claim 67 wherein said means to change the wavefront radius of curvature of said second beam of light once it has passed through said first quarter-wave plate include a positive lens; and wherein said means to reflect said first-order portion of said second beam of light back through said first quarter-wave plate, said first frequency shifter, and said first polarizing beam splitter include a mirror positioned to reflect said first-order portion of said second beam of light, said mirror having a stop positioned in the path of said zero-order portion of said second beam of light.

70. An optical device for determining rotation including:

a light source which produces a first beam of light;

means for splitting said first beam of light into at least second and third beams of light and recombining said second and third beams into a fourth beam of light;

means for directing said second and third beams of light in opposite directions along a path about a predetermined axis about which the rotation is to be measured to establish a counterpropagating light path for said second and third beams including an optical fiber;

means capable of varying nonreciprocal phase shift between said second and third beams of light positioned in said second and third beams of light including piezoelectric means connected to apply force to said optical fiber and means to introduce a phase dither in said second and third beams of light; and means for detecting said fourth beam of light and producing therefrom an output indicative of the rotation about said predetermined axis.

71. An optical device for determining rotation including:

a light source which produces a first beam of light;

means for splitting said first beam of light into at least second and third beams of light and recombining said second and third beams into a fourth beam of light;

means for directing said second and third beams of light in opposite directions along a path about a predetermined axis about which the rotation is to be measured to establish a counterpropagating light path for said second and third beams;

means capable of varying nonreciprocal phase shift between said second and third beams of light positioned in said second and third beams of light including means to introduce a phase dither in said second and third beams of light which include an optical fiber through which said second and third beams of light pass and means to apply force to said optical fiber; and means for detecting said fourth beam of light and producing therefrom an output indicative of the rotation about said predetermined axis.

72. The device as defined in claim 71 wherein said means to apply force to said optical fiber include piezoelectric means connected to said fiber.

73. An optical device for determining rotation including:

a light source which produces a first beam of light;

means for splitting said first beam of light into at least second and third beams of light and recombining said second and third beams into a fourth beam of light;

means for directing said second and third beams of light in opposite directions along a path about a predetermined axis about which the rotation is to be measured to establish a counterpropagating light path for said second and third beams, including:

an optical fiber wound in a coil about said predetermined axis about which the rotation is to be measured, said optical fiber having first and second ends; and means for applying said second and third beams of light to said first and second fiber ends respectively;

means capable of varying nonreciprocal phase shift between said second and third beams of light positioned in said second and third beams of light including piezoelectric means connected to apply force to said optical fiber; and means for detecting said fourth beam of light and producing therefrom an output indicative of the rotation about said predetermined axis.

74. An optical device for determining rotation including:

a light source which produces a first beam of light;

means for splitting said first beam of light into at least second and third beams of light and recombining said second and third beams into a fourth beam of light;

means for directing said second and third beams of light in opposite directions along a path about a predetermined axis about which the rotation is to be measured to establish a counterpropagating light path for said second and third beams, including:

an optical fiber wound in a coil about said predetermined axis about which the rotation is to be measured, said optical fiber having first and second ends; and means for applying said second and third beams of light to said first and second fiber ends respectively;

means capable of varying nonreciprocal phase shift between said second and third beams of light positioned in said second and third beams of light including at least a first light beam frequency shifter positioned in said counterpropagating light path to introduce and vary nonreciprocal phase shift in said second and third beams of light wherein said first light beam frequency shifter includes an optical fiber positioned in said counterpropagating light path and a piezoelectric element connected to apply force thereto to induce nonreciprocal phase shift in light in said counterpropagating light paths; and means for detecting said fourth beam of light and producing therefrom an output indicative of the rotation about said predetermined axis.

* * * * *